(12) United States Patent
Baltrucki et al.

(10) Patent No.: US 11,255,226 B2
(45) Date of Patent: Feb. 22, 2022

(54) LASH ADJUSTER CONTROL IN ENGINE VALVE ACTUATION SYSTEMS

(71) Applicant: Jacobs Vehicle Systems, Inc., Bloomfield, CT (US)

(72) Inventors: Justin D. Baltrucki, Canton, CT (US); Gabriel S. Roberts, Wallingford, CT (US); Matei Alexandru, Somers, CT (US); John Mandell, Vernon, CT (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 34 days.

(21) Appl. No.: 16/409,614

(22) Filed: May 10, 2019

(65) Prior Publication Data
US 2019/0264584 A1    Aug. 29, 2019

Related U.S. Application Data

(63) Continuation-in-part of application No. 16/186,500, filed on Nov. 10, 2018, now Pat. No. 10,590,810.
(Continued)

(51) Int. Cl.
*F01L 1/34*      (2006.01)
*F01L 1/24*      (2006.01)
(Continued)

(52) U.S. Cl.
CPC .............. *F01L 1/2411* (2013.01); *F01L 1/08* (2013.01); *F01L 1/2416* (2013.01); *F01L 1/267* (2013.01);
(Continued)

(58) Field of Classification Search
CPC ... F01L 1/255; F01L 1/08; F01L 1/181; F01L 1/24; F01L 1/2416; F01L 1/26;
(Continued)

(56) References Cited

U.S. PATENT DOCUMENTS

| 5,584,268 A | 12/1996 | Natkin et al. |
| 9,611,767 B2 | 4/2017 | Baltrucki |

(Continued)

FOREIGN PATENT DOCUMENTS

| WO | 2016174493 A1 | 11/2016 |
| WO | 2017160379 A1 | 9/2017 |
| WO | 2020221477 A1 | 11/2020 |

OTHER PUBLICATIONS

Office Action for U.S. Appl. No. 18/186,500 dated Sep. 13, 2019, 24 pages.
Written Opinion of the ISA for International Appl. No. PCT/US2018/060225 dated Mar. 11, 2019, 7 pages.
International Search Report for International Appl. No. PCT/US2018/060225 dated Mar. 11, 2019, 3 pages.
(Continued)

*Primary Examiner* — Zelalem Eshete
(74) *Attorney, Agent, or Firm* — Moreno IP Law LLC

(57) ABSTRACT

Systems for valve actuation in internal combustion engines provide configurations for hydraulic lash adjusters and valve actuation valvetrain components that are particularly suitable for prevention of HLA jacking in dedicated cam environments including Type II valvetrain architectures. In one implementation, a lash adjuster loading component, which may comprise a stroke-limited spring biased piston associated with the main event valvetrain keeps the lash adjuster under a constant compressive force to prevent jacking.

22 Claims, 17 Drawing Sheets

Related U.S. Application Data

(60) Provisional application No. 62/584,642, filed on Nov. 10, 2017.

(51) Int. Cl.
| | | |
|---|---|---|
| *F01L 1/08* | (2006.01) | |
| *F01L 1/26* | (2006.01) | |
| *F01L 9/12* | (2021.01) | |
| *F16K 31/60* | (2006.01) | |
| *F01L 13/06* | (2006.01) | |
| *F01L 1/053* | (2006.01) | |
| *F01L 1/047* | (2006.01) | |
| *F01L 13/00* | (2006.01) | |

(52) U.S. Cl.
CPC ............... *F01L 9/12* (2021.01); *F01L 13/065* (2013.01); *F16K 31/607* (2013.01); *F01L 1/053* (2013.01); *F01L 2001/0475* (2013.01); *F01L 2013/105* (2013.01); *F01L 2305/00* (2020.05)

(58) Field of Classification Search
CPC ............. F01L 13/065; F01L 2001/2433; F01L 2013/105; F01L 2105/00
See application file for complete search history.

(56) References Cited

U.S. PATENT DOCUMENTS

| | | | |
|---|---|---|---|
| 9,752,471 | B2 | 9/2017 | Meneely et al. |
| 2004/0250802 | A1* | 12/2004 | Yang .................... F02D 13/0226 |
| | | | 123/568.14 |
| 2008/0190391 | A1 | 8/2008 | McElwee et al. |
| 2010/0065019 | A1 | 3/2010 | Yang |
| 2011/0079196 | A1 | 4/2011 | Kraft et al. |
| 2012/0298057 | A1 | 11/2012 | Janak et al. |
| 2014/0020644 | A1 | 1/2014 | Roberts et al. |
| 2014/0083381 | A1 | 3/2014 | Roberts et al. |
| 2015/0122220 | A1 | 5/2015 | Cecur |
| 2015/0354418 | A1 | 12/2015 | Jo et al. |
| 2016/0084122 | A1 | 3/2016 | Baltrucki |
| 2016/0356187 | A1* | 12/2016 | Meneely ................. F01L 1/181 |
| 2017/0175597 | A1 | 6/2017 | Cecur |
| 2017/0321576 | A1 | 11/2017 | Nielsen |

OTHER PUBLICATIONS

International Search Report for International Application No. PCT/IB2020/054358 dated Aug. 4, 2020, 3 pages.

Written Opinion of the International Search Authority for International Application No. PCT/IB2020/054358 dated Aug. 4, 2020, 6 pages.

Supplementary European Search Report for European Application No. 18875851 dated Jul. 2, 2021, 11 pages.

* cited by examiner

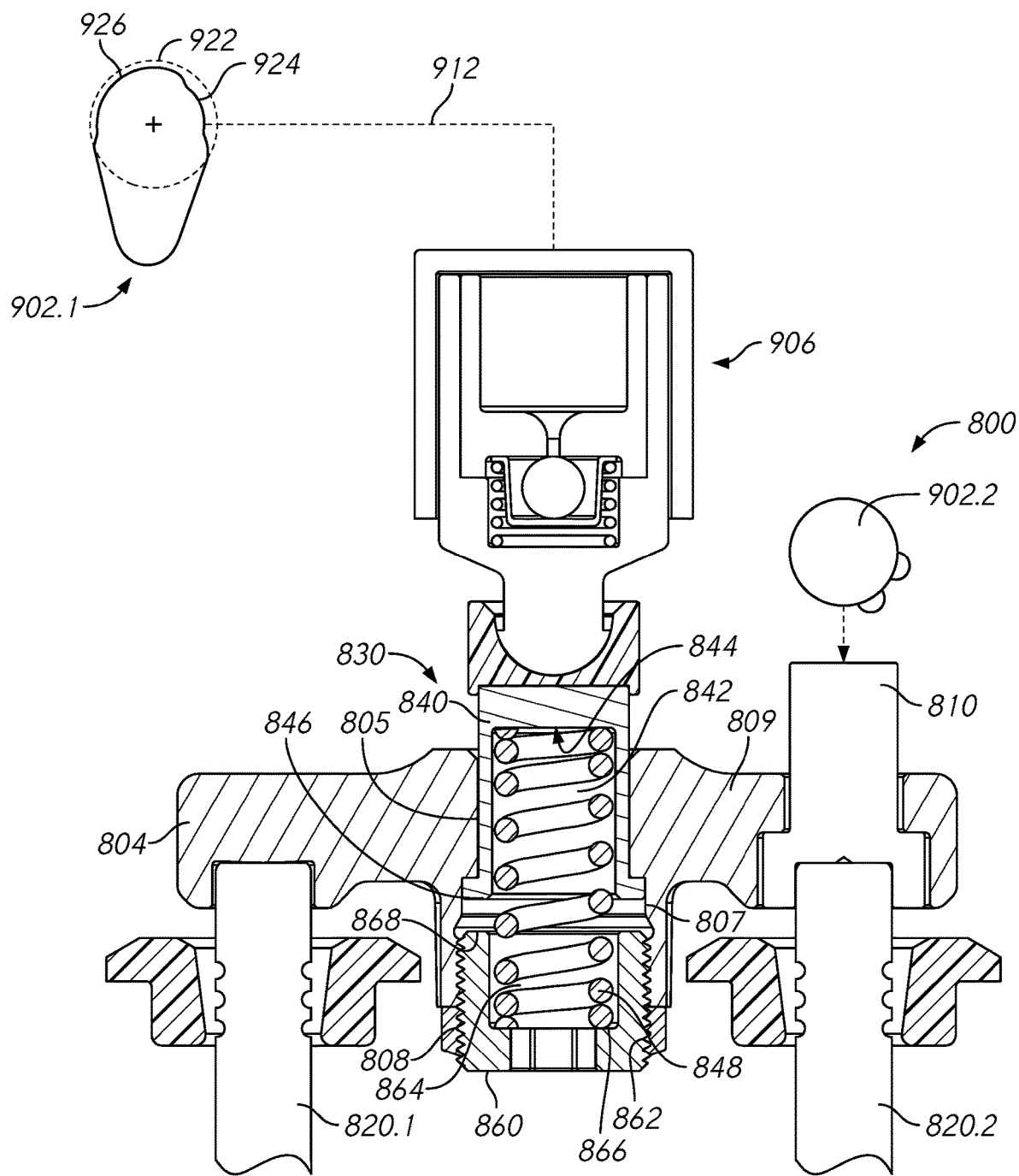
FIG. 9.1

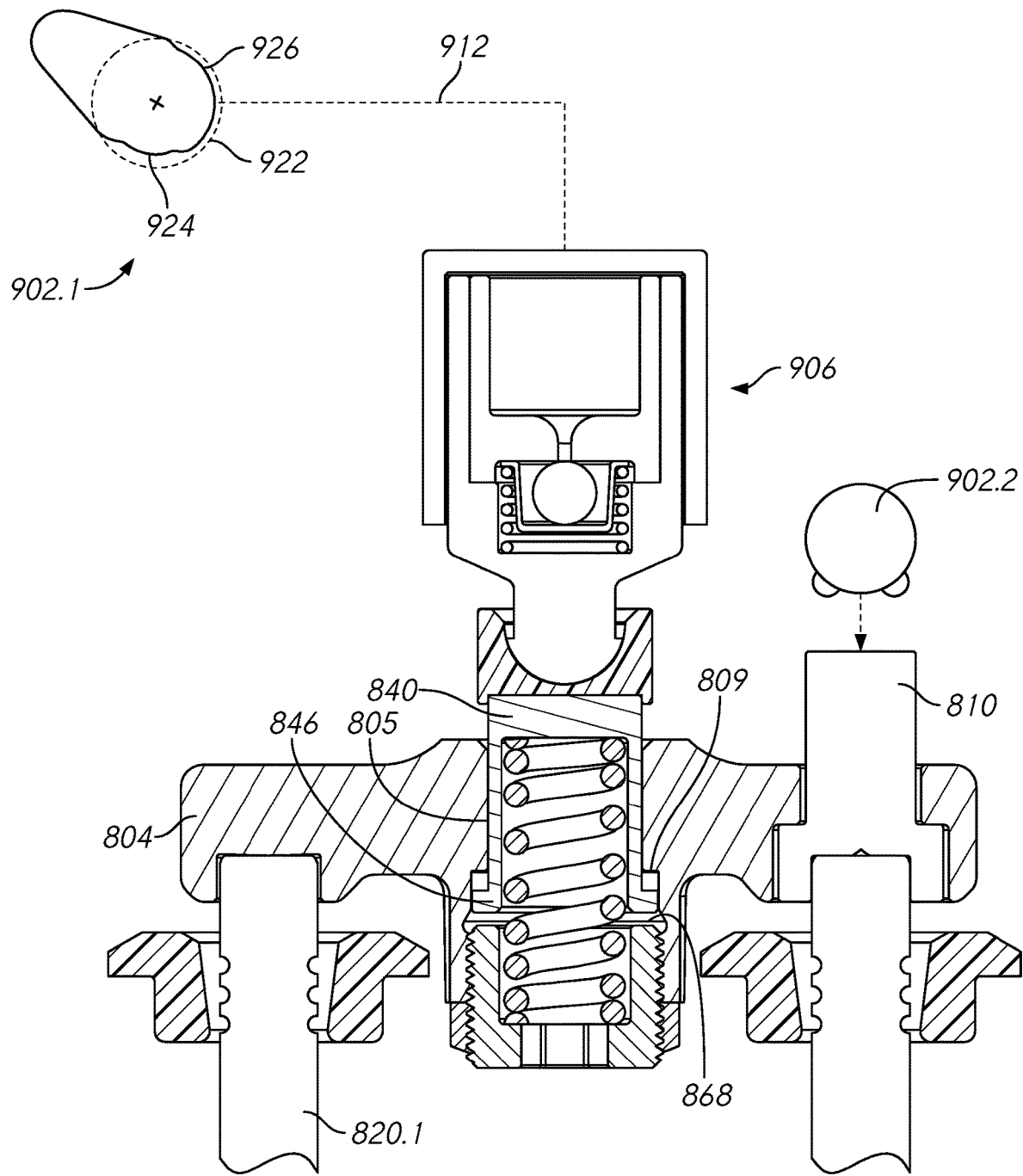
FIG. 9.2

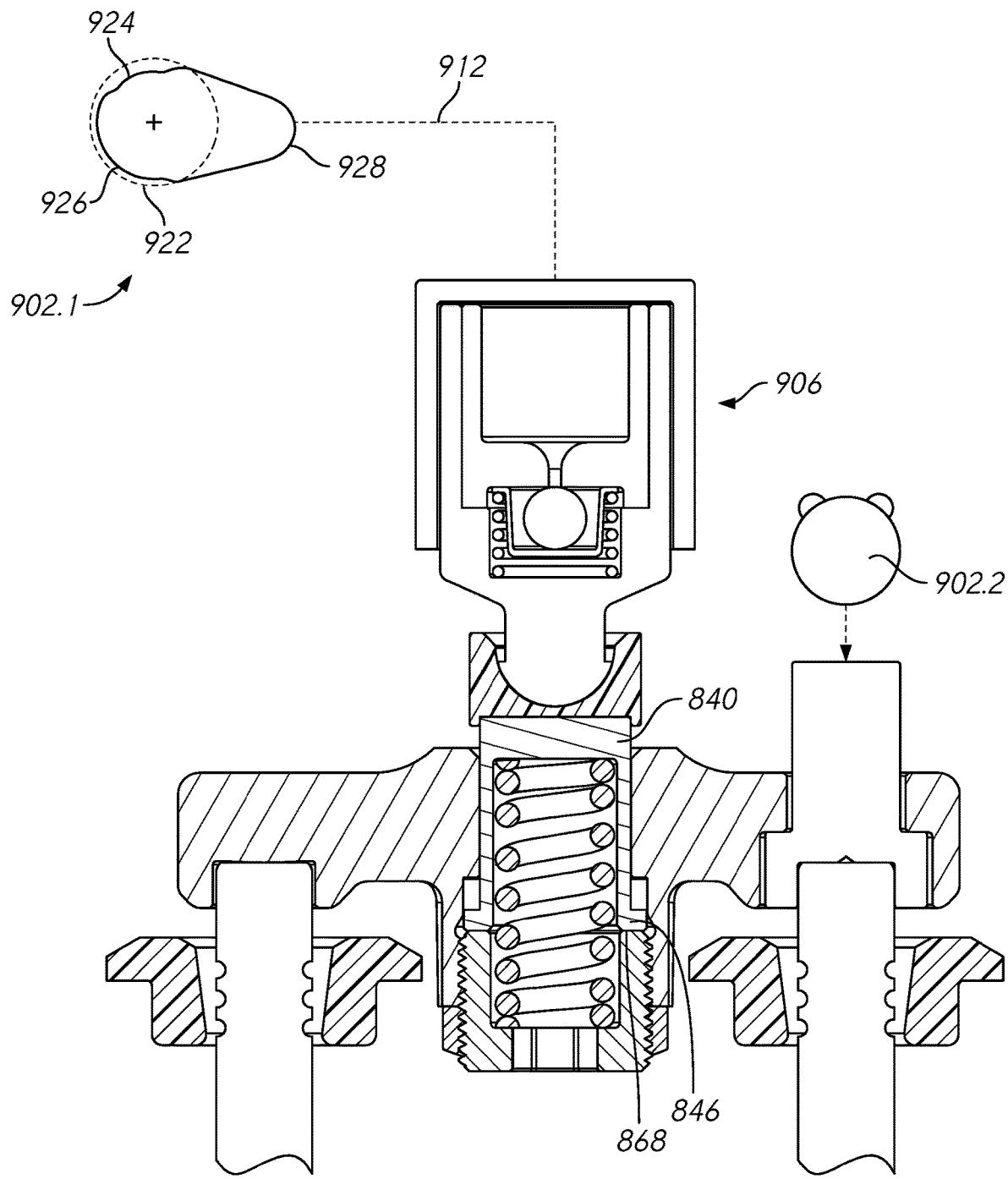
FIG. 9.3

LASH ADJUSTER CONTROL IN ENGINE VALVE ACTUATION SYSTEMS

FIELD

This disclosure relates generally to systems for actuating valves in internal combustion engines. More particularly, this disclosure relates to engine valve actuation systems that include features for controlling and preventing over-extension of lash adjusters.

BACKGROUND

Internal combustion engines require valve actuation systems to control the flow of combustible components, typically fuel and air, to one or more combustion chambers during operation. Such systems control the motion and timing of intake and exhaust valves during engine operation. In a positive power mode, intake valves are opened to admit fuel and air into a cylinder for combustion and exhaust valves are subsequently opened to allow combustion products to escape the cylinder. This operation is typically called a "positive power" operation of the engine and the motions applied to the valves during positive power operation are typically called "main event" valve actuation motions. Auxiliary valve actuation motion, such as motion that results in engine braking (power absorbing), may be accomplished using "auxiliary" events imparted to one or more of the engine valves.

Valve movement during main event positive power modes of operation is typically controlled by one or more rotating cams as motion sources. Cam followers, push rods, rocker arms and other elements disposed in a valvetrain provide for direct transfer of motion from the cam surface to the valves. The use of a valve bridge may impart motion to plural valves from a single upstream valvetrain. For auxiliary events, "lost motion" devices may be utilized in the valvetrain to facilitate auxiliary event valve movement. Lost motion devices refer to a class of technical solutions in which valve motion is modified compared to the motion that would otherwise occur as a result of actuation by a respective cam surface alone. Lost motion devices may include devices whose length, rigidity or compressibility is varied and controlled in order to facilitate the selective occurrence of auxiliary events in addition to, or as an alternative to, main event operation of valves. Auxiliary events may also be facilitated by dedicated cam systems in which a separate auxiliary or braking cam and valvetrain may be used to impart auxiliary motion to one or more valves to facilitate the selective occurrence of auxiliary events.

Lash adjustment features are typically provided on valve actuation systems to facilitate the elimination of lash, which is excessive clearance between valvetrain components that can lead to excessive noise, vibration, impact forces and wear. For example, during braking events, substantial lash may be introduced into the engine valvetrain. Lash adjusters, which are typically hydraulic lash adjusters ("HLA's"), may include mechanical components that cooperate to expand under hydraulic pressure in a lash take-up mode during one portion of the valve cycle, typically when the valvetrain is under zero lift or unloaded, and then assume a hydraulically "locked" or incompressible mode during valve opening portion of the valve cycle, typically when the valvetrain is under high load, for example, during a main event actuation. One challenge related to the use of HLA's is the prevention of over-extension or "jacking" of the HLA, which may occur when the HLA is permitted to extend too far in the take-up mode and becomes hydraulically locked in the over-extended position. This can result in excessive valvetrain forces and other undesirable consequences. As such measures have been taken in the prior art to prevent jacking by maintaining suitable loads on the HLA or to limit HLA extension.

Lost motion cam systems typically use at least one cam with different profiled lift sections on the same cam lobe to impart motion for respective main event and one or more auxiliary events. These different profiled lift sections are activated or deactivated using a separate lost motion mechanism, such as a piston or actuator, located in the valvetrain. Example auxiliary events include engine braking, early exhaust valve opening (EEVO), or late intake valve closing (LIVC) lift events, and can be imparted to one or more valves in a valve set (i.e., two exhaust valves for a respective cylinder). Lost motion auxiliary valve lift systems, such as lost motion braking systems may employ a single rocker associated with the lost motion cam and a valve bridge associated with the rocker for actuating two engine valves in main event motion. Auxiliary valve lift or braking motion on one of the valves is facilitated by an auxiliary valve lift or braking actuator, which is a lost motion device that may be housed in the rocker and may selectively impart auxiliary or braking motion to the valve by way of a bridge pin disposed in the bridge and providing for independent motion relative thereto. The auxiliary valve lift or braking actuator is selectively activated and deactivated such that the auxiliary or braking event lift profile section or lobe on the lost motion cam only results in auxiliary or braking motion on the valve when an auxiliary event, such as engine braking is desired.

On the other hand, dedicated cam valve actuation systems may utilize a dedicated auxiliary motion source and dedicated auxiliary valvetrain components, at least some of which are separate from the main event motion source and valvetrain, to facilitate auxiliary events. U.S. Pat. No. 8,851,048 to Meistrick, for example, the subject matter of which is incorporated herein by reference in its entirety, describes a dedicated cam system in which main event motion is imparted to a valve bridge and ultimately to two engine valves cooperating therewith. Auxiliary motion of one of the engine valves may be facilitated by a dedicated auxiliary motion source (cam) which cooperates with an auxiliary rocker to transmit auxiliary motion through a bridge pin in the valve bridge, and ultimately to one engine valve to cause auxiliary events, such as braking events.

Dedicated cam valve actuation systems may include systems commonly known as "Type II" valvetrain architectures, as described in SAE Technical Paper 2007-01-1285, titled "Design and Development of a 2-Step Rocker Arm." These architectures may include a rocker arm that pivots about a fulcrum at one end, with an opposite end engaging a valve or valvetrain components cooperating with a valve. Main event motion may be imparted at a central or intermediate location on the rocker arm by a main event motion source, such as a main event cam. These systems may utilize lash adjusters. In Type II architectures, the lash adjuster may not be disposed directly in the main event load path but may instead serve as a reaction force to the main event load and be disposed, for example, in a position in which lash is adjusted by relative movement of the rocker arm pivot.

In engine environments where auxiliary motion is facilitated by a dedicated auxiliary motion source, such as a dedicated cam and rocker, or a bolt-on master/slave brake, which may be separate from the main event motion source, in the above-described Type II architectures and other environments, challenges in preventing lash adjuster over-extension may be presented.

It would therefore be advantageous to provide systems that address the aforementioned shortcoming and others in the prior art.

SUMMARY

Responsive to the foregoing challenges, the instant disclosure provides various embodiments of valve actuation systems with features for controlling and preventing over-extension of lash adjusters, which may be applied in both lost-motion and dedicated cam auxiliary motion systems. More particularly, the disclosure describes systems in which a lash adjuster loading component may cooperate, either directly or indirectly through other valvetrain components, with a lash adjuster to prevent over-extension thereof. The lash adjuster loading component may be disposed in or cooperate with various elements in the valvetrain and may apply or facilitate the application of a biasing force on the lash adjuster at times during the engine cycle when the lash adjuster may be otherwise prone to over-extension. The described systems therefore facilitate lash adjuster operation and reduced risk of lash adjuster over-extension or "jacking" in both integrated lost motion as well as dedicated auxiliary cam/valvetrain engine environments.

According to one aspect, a system for actuating at least one of two or more engine valves in an internal combustion engine may comprise, a main event motion source, a main event valvetrain for transmitting motion from the main event motion source through a main event load path to the at least one valve; an auxiliary event motion source; an auxiliary event valvetrain for transmitting auxiliary motion to the at least one valve; a lash adjuster cooperating with the main event load path; and a lash adjuster loading component cooperating with the lash adjuster.

According to another aspect of the disclosure, an apparatus or system for actuating at least one of two or more engine valves that may be particularly suited for dedicated cam systems in an internal combustion engine may comprise a main event motion source, a main event valvetrain for transmitting motion from the main event motion source to the valve bridge through a first load path, an auxiliary event motion source, separate from the main event motion source, an auxiliary event valvetrain for transmitting motion from the auxiliary motion source to one of the two or more engine valves through a second load path, a lash adjuster disposed in the first load path, and a lash adjuster loading component disposed in the first load path for preventing over-extension of the lash adjuster. The lash adjuster loading component may comprise a stroke-limited, spring-loaded piston disposed in a valve bridge, or other main event valvetrain component, such as a rocker, and may have a fixed stroke defined by upper and lower limits and a biasing component, such as a compression spring, for biasing the piston against the lash adjuster to control the lash adjuster extension during auxiliary events. The lash adjuster loading component may assume a lash adjuster refill state, which permits refill of the lash adjuster, a preload state, in which the lash adjuster loading component applies a biasing force to the lash adjuster, and a main event state, in which the lash adjuster loading component transmits high loads from the main event motion source to the valve bridge. The main event motion source may include a preload cam surface and a lash adjuster refill cam surface in addition to the main event lift surface to cause the lash adjuster loading component to assume the lash adjuster refill and preload states during operation. The lash adjuster loading component may thus provide control of lash adjuster refill and prevent lash adjuster over-extension in operational environments that may include a separate main event and auxiliary motion sources.

According to another aspect of the disclosure, an apparatus or system for actuating at least one of two or more engine valves that may be particularly suited for dedicated cam systems in Type II valvetrain architectures in an internal combustion engine. The system may comprise a main event motion source, a main event valvetrain for transmitting motion from the main event motion source to the valve bridge through a first load path, an auxiliary event motion source, separate from the main event motion source, an auxiliary event valvetrain for transmitting motion from the auxiliary motion source to an engine valve through a second load path, a lash adjuster, and a lash adjuster loading component cooperating with the first load path for preventing over-extension of the lash adjuster. The lash adjuster loading component may comprise a stroke-limited, spring-loaded piston or a spring-loaded lever arm disposed in or cooperatively associated with an end pivoted rocker arm, a pivot, or another valvetrain component. The spring biased piston may have a fixed stroke defined by upper and lower limits and a biasing component, such as a compression spring, for biasing the piston against the lash adjuster to control the lash adjuster extension during auxiliary events. The lash adjuster loading component may assume a lash adjuster refill state, which permits refill of the lash adjuster, a preload state, in which the lash adjuster loading component applies a biasing force to the lash adjuster, and a main event state, in which the lash adjuster loading component transmits high loads from the main event motion source to the valve bridge. The main event motion source may include a preload cam surface and a lash adjuster refill cam surface in addition to the main event lift surface to cause the lash adjuster loading component to assume the lash adjuster refill and preload states during operation. The lash adjuster loading component may thus provide control of lash adjuster refill and prevent lash adjuster over-extension in Type II operational environments that may include a separate main event and auxiliary motion sources.

Other aspects and advantages of the disclosure will be apparent to those of ordinary skill from the detailed description that follows and the above aspects should not be viewed as exhaustive or limiting. The foregoing general description and the following detailed description are intended to provide examples of the inventive aspects of this disclosure and should in no way be construed as limiting or restrictive of the scope defined in the appended claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples according to aspects of the disclosure and are not intended to be limiting to the scope of invention, which is set forth in the claims appended hereto.

FIG. 9.1 is a cross-section showing the valve actuation system of FIG. 8 including a lash adjuster loading component, which is shown in a topped-out position which permits refill of the lash adjuster.

FIG. 9.2 is a cross-section showing the valve actuation system of FIG. 8 including a lash adjuster loading component, which is shown in a preload position in which the lash adjuster is subject to a biasing force transmitted from the lash adjuster loading component.

FIG. 9.3 is a cross-section showing the valve actuation system of FIG. 8, including a lash adjuster loading component, which is shown in a bottomed-out position in which main event motion is transmitted to the valve bridge.

DETAILED DESCRIPTION

The functionality of components in an example valve actuation system according to aspects of the disclosure will first be explained generally, followed by a description of a more detailed example implementation. These general and example descriptions are intended to be illustrative and not exhaustive or limiting with regard to the inventions reflected in this disclosure.

Figure 1:
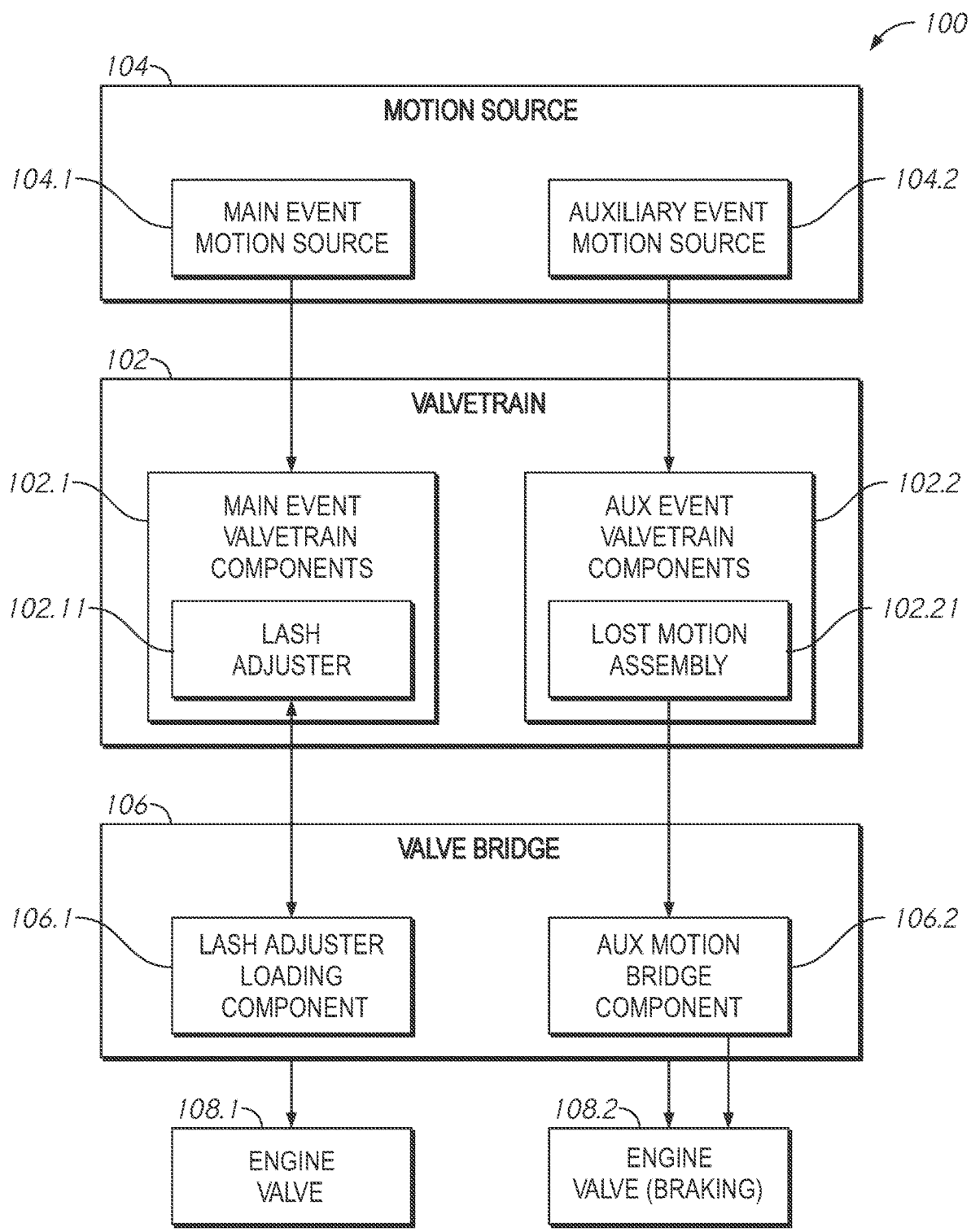
FIG. 1 is a schematic block diagram of a valve actuation system in accordance with aspects of the instant disclosure.

FIG. 1 is a schematic block diagram of a valve actuation system 100 according to aspects of the disclosure. A valve actuation motion source 104 may include main event motion source components 104.1 and auxiliary event motion source components 104.2. For example, the valve actuation motion source 104 may comprise a cam and camshaft driving components. The main event motion source components 104.1 may comprise a main event cam lobe on the cam and the auxiliary event motion source 104.2 may comprise one or more auxiliary or lost motion cam lobes on the cam.

Motion from the motion sources 104.1 and 104.2 is transferred to valvetrain 102, which may comprise main event motion valvetrain components 102.1 and auxiliary event motion valvetrain components 102.2. It will be recognized that the valvetrain motion components 102.1 and 102.2 may comprise common elements. For example, the main event motion valvetrain components 102.1 and the auxiliary event motion valvetrain components 102.2 may utilize a common cam follower and a common rocker arm. Main event valvetrain components 102.1 may include a lash adjuster 102.11, which may be a hydraulic lash adjuster.

A lash adjuster 102.11 may be disposed in one of the main event motion valvetrain components 102.1, in which case that component can function as a housing for the lash adjuster. A lost motion assembly 102.21 may be included in the auxiliary event motion valvetrain components 102.2, in which case the component can function as a housing for the lost motion assembly.

The valvetrain 102 and components thereof cooperates with the valve bridge 106, which may impart motion to engine valves 108.1 and 108.2. According to an aspect of the disclosure, a lash adjuster loading component 106.1 may be housed in the valve bridge 106 and may cooperate with the lash adjuster 102.11 to keep the lash adjuster in a loaded state (i.e., with a force against the extended direction of the lash adjuster). Valve bridge 106 may also house an auxiliary motion bridge component 106.2, which may be a component that permits transfer of motion from the lost motion assembly 102.21 to a braking engine valve 108.2 without imparting motion to the valve bridge 106.

Figure 2:
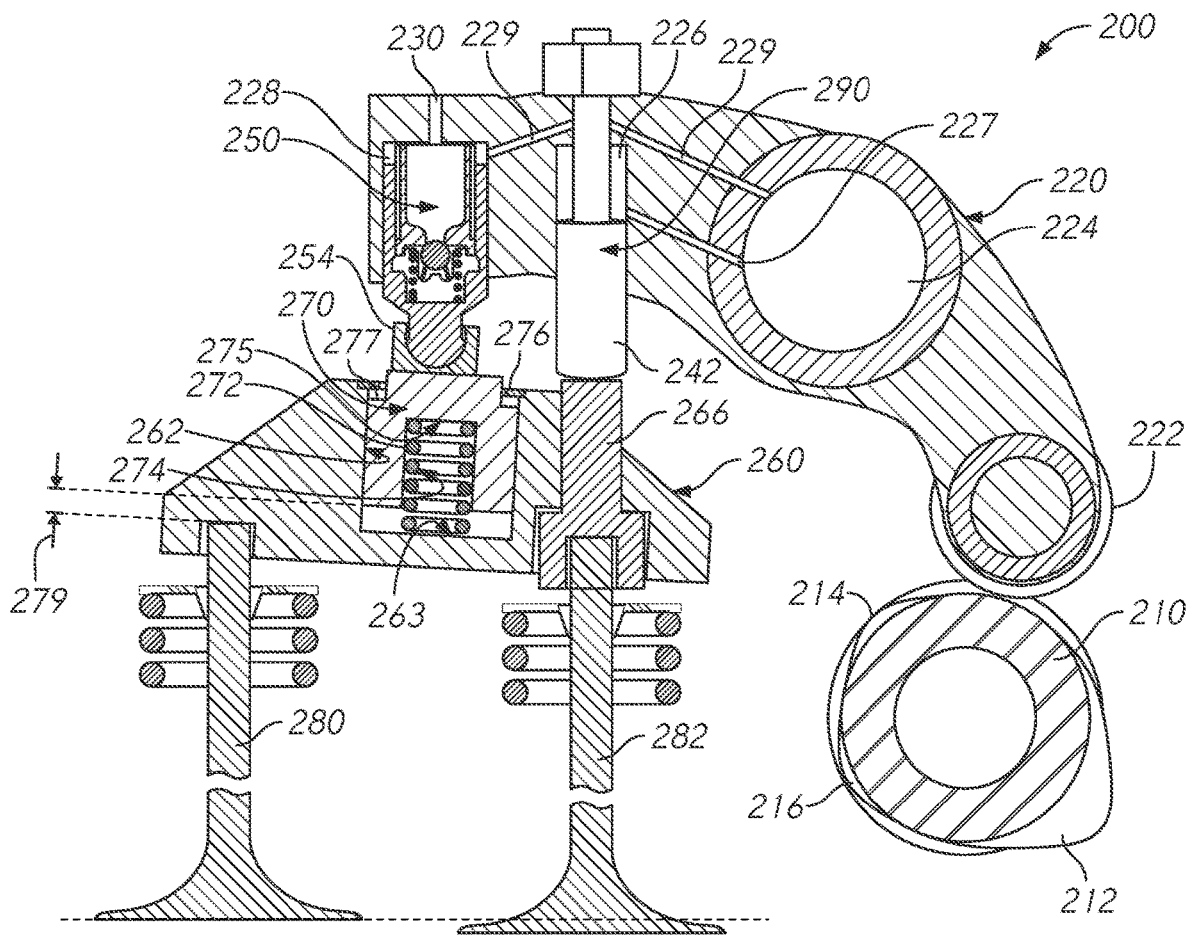
FIG. 2 is a schematic example implementation of a valve actuation system in accordance with the instant disclosure and the system of FIG. 1.
Figure 3:
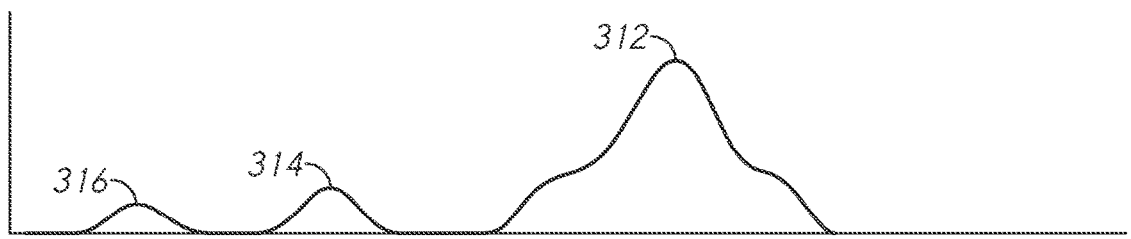
FIG. 3 is graphic representation of a lost motion cam profile.

FIG. 2 is a schematic illustration of a valve actuation system 200 in an implementation which is consistent with the functional block diagram of FIG. 1. A valve actuation motion source may be a lost motion cam 210 including a main event lobe 212 and auxiliary event lobes 214 and 216. Auxiliary events may include, but are not limited to, braking events, such as compression release (CR) braking, EEVO, LIVC or exhaust gas recirculation (EGR). Referring additionally to FIG. 3, further details of a lost motion cam are illustrated. An example profile of a lost motion cam may include a main event lobe profile 312, and auxiliary event lobe profiles 314 and 316. Corresponding motions are transmitted to the rocker arm 220 during each full rotation of the lost motion cam 210. Such motions may be selectively further transmitted to other valvetrain components, as will be further explained, to effect desired motion on the engine valves during main event and auxiliary events.

A rocker arm 220 includes a cam follower 222 and is mounted for pivoting or rotational movement about a rocker arm shaft (not shown) extending through rocker arm journal 224. Rocker arm 220 may include a first bore 226 for housing an inboard valve actuator 240 and a second bore 228 for housing an HLA 250. As those of ordinary skill in the art will recognize, rocker arm 220 will typically include a fluid passage 229 (represented schematically) therein for providing a constant supply of pressurized hydraulic fluid from the rocker arm journal 224 interior surface to the second bore 228 and the HLA. A vent 230 may provide for outflow of the hydraulic fluid from the piston bore 228. The hydraulic fluid is typically supplied via the rocker arm shaft (not shown). As is known in the art, the HLA may passively assume a lash adjustment mode, in which it fills with pressurized hydraulic fluid through ported passages in the rocker arm such that the HLA expands to take up lash in the valvetrain, and a hydraulically "locked" mode in which it is hydraulically isolated the hydraulic fluid within it is checked against outflow and therefore incompressible, essentially functioning as a solid component. HLA may support a pivot 252 and a cooperating pedestal or foot 254, which may pivot or rotate relative to the pivot 252, thus providing for pivoting movement of the valve bridge 260, to some degree. Passage 227 may include a control valve for preventing backflow of oil from the actuator piston circuit when load is applied.

In this implementation, according to inventive aspects of the disclosure, the HLA is subject to the stroke-limited compressive force provided by a lash adjuster loading component in the form of the stroke limited piston 270 disposed in a bore 262 in the valve bridge 260. The stroke of the lash adjuster loading component is biased in a way that compresses the HLA, but is also limited by a stroke limiter 276 to prevent over compression of the HLA. A compression spring 272 is disposed in an internal bore 274 of the piston 270 and engages an end wall 275 thereof. An opposite end of compression spring 272 engages a bottom wall 263 of the valve bridge bore 262 and thus provides an upward force on the piston 270. A stroke limiter 276, which may be a snap ring or retaining ring fastened to the valve bridge 260, may engage and prevent upward travel of a shoulder 277 of the piston 270 and thus limits the upward movement of the piston 270 relative to the valve bridge 260.

Main event valve motion may be conveyed along a first load path from motion source (lost motion cam) 210 to the two engine valves 280, 282. More particularly, the first load path may be defined by the cam follower 222, rocker arm 220, the HLA 250 and the valve bridge 260. The first load path from the motion source to the engine valves may thus include valvetrain components of the cam follower 222, rocker arm 220, and HLA, including the pivot 252 and pedestal 254.

Auxiliary motion, such as braking motion, may be imparted to one of the engine valves 282, via a second load path, which includes the inboard valve actuator 240. An auxiliary motion bridge component, in this case in the form of bridge pin 266, may provide for the transfer of motion, separate from motion of the valve bridge 260, from the inboard valve actuator 240 to the braking valve 282. Inboard valve actuator 240 is a lost motion assembly or device, which may be selectively hydraulically activated and deactivated, via a switched hydraulic passage 227, at appropriate times during an engine cycle to effect auxiliary events, such as engine braking. Switched hydraulic passage 227 provides hydraulic fluid to piston bore 226, typically from an axially extending passage (not shown) in the rocker shaft which provides hydraulic fluid to a number of valve rockers mounted on the shaft. In an activated state, a piston 242 forming the inboard valve actuator 240 may be extended out of a corresponding piston bore 226 and maintained in an incompressible or solid extended state and thus transfer motion. In a deactivated state, the actuator piston 242 of the inboard valve actuator may be permitted to retract into its bore 226, thereby losing any transferred motion from the rocker arm and thus be in a compressible or motion absorbing state. As will be recognized, in this implementation, a second load path from the motion source to the braking valve 282 is defined by the auxiliary event motion valvetrain components (cam follower 222, rocker arm 220, inboard valve actuator 240) and by bridge pin 266.

As will be recognized, in accordance with inventive aspects of the disclosure, the above-described implementation provides separate load paths for the lash-adjusted main event valve actuation and the auxiliary event (braking) valve actuation. In operation, when engine braking is undertaken, inboard valve actuator 240 extends to impart motion to the inboard valve 282 only, it being recognized that rocker arm 220 will, at substantially the same time, have motion imparted by one of the auxiliary lobes on the lost motion cam. As the rocker goes from the inner base circle of the cam to the base circle defined by the auxiliary lobe, the rocker 220 will generate more stroke at the HLA, which is disposed at a further distance from the rocker arm pivot (center of the rocker arm shaft) than the inboard valve actuator. The lash adjuster loading component (stroke-limited bridge piston 270) will thus create a compressive load on the HLA and prevent any over-extension or jacking as the inboard side (right side in FIG. 2) of bridge 260 pivots downward in conjunction with the downward movement of bridge pin 266, which moves under force from the inboard valve actuator 240.

As shown in FIG. 2, a clearance exists between the bottom surface of the piston 270 and the bottom wall 263 of the valve bridge bore. This clearance defines a lost motion travel distance 279 for the piston lash adjuster loading component. The lost motion travel distance may be selected to ensure that the auxiliary event motions of the rocker arm 220 are "lost" and do not result in undesired motion of the valve bridge 260 and engine valves 280 and 282. That is, in a braking event, valve 282 will be actuated under motion from a braking lobe in the cam 210 transmitted via the inboard valve actuator, while the motion of the rocker arm 220 and HLA will be "lost" via the stroke limited piston 270 and not transmitted to the valve bridge or engine valve 280 until the piston 270 bottoms against bottom wall 263 of the valve bridge bore and results in motion of the valve bridge and opening of both valves for main event motion. The lost motion gap is designed to "lose" the motion that would otherwise result from the auxiliary event cam lift profiles, but without losing the main event motion.

Figure 4A:
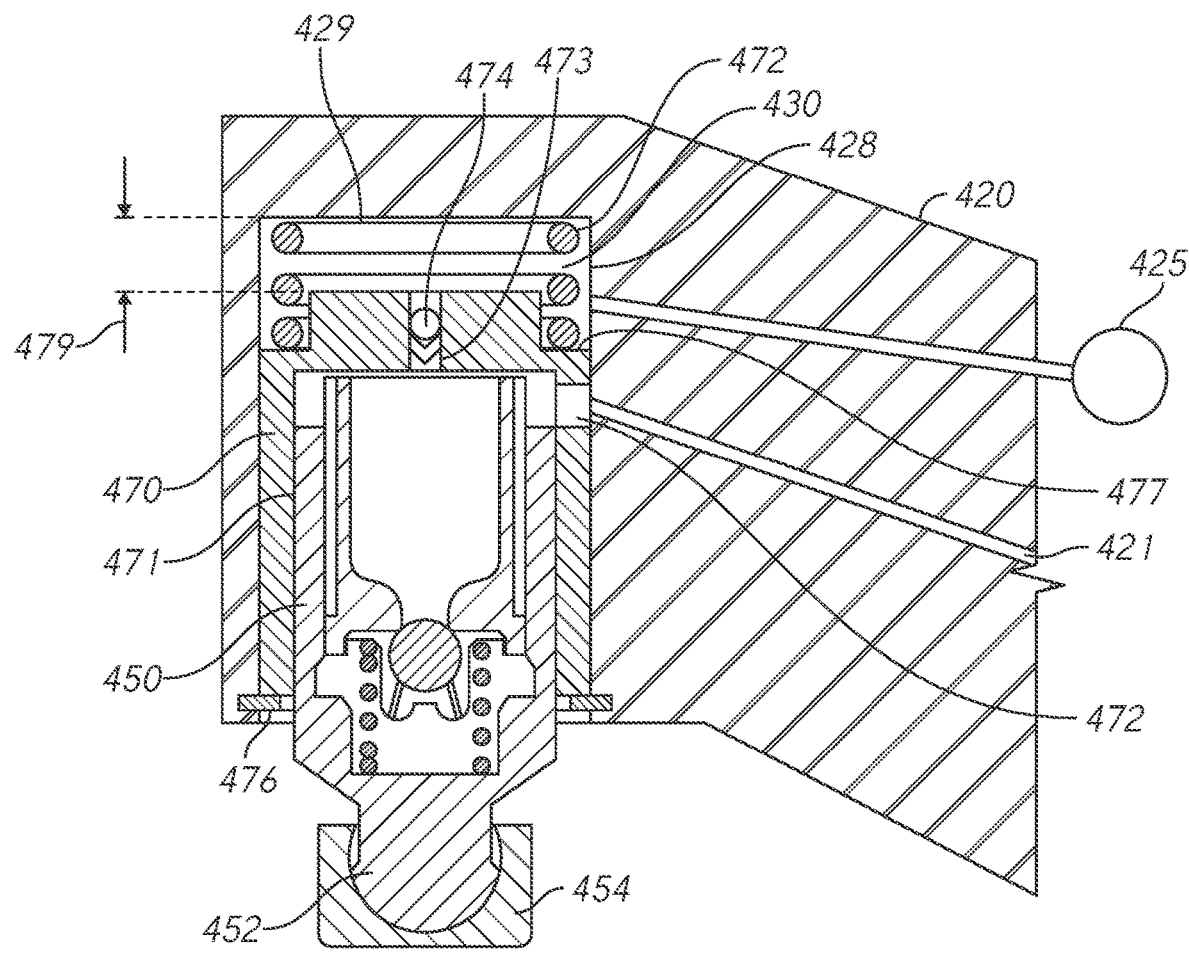
FIG. 4A is a cross-section showing details of another implementation of a lash adjuster and lash adjuster loading component in a modified configuration compared to that of FIGS. 1 and 2.

FIG. 4A illustrates an alternative arrangement for a lash adjuster loading component and HLA, according to aspects of the disclosure. In this implementation, features of the stroke limited piston are integrated into the rocker arm rather than the valve bridge (as in FIG. 2). This arrangement permits valve braking motion to be accomplished via the same load path in which the lash adjuster is disposed and thus may be used to eliminate the need for an independent valve actuator (inboard valve actuator) for facilitating valve braking motion. In this regard, the load path in which the lash adjuster is disposed (first load path) and the load path in which the auxiliary valve motion actuator is disposed (second load path) are the same. A rocker arm 420 may include a bore 428 for receiving a stroke limited piston 470, which in turn includes an HLA-receiving bore 471 for supporting an HLA therein. A travel limiter 476 limits travel (in a downward direction) of piston 470. A compression spring 472 is disposed in the rocker arm bore 428 and engages a shoulder 477 on the piston 470 on one end and a bottom bore wall 429 on another end, providing a compressive force on the HLA against the bridge (not shown) which is engaged by the pivot 452 and pedestal 454. As in the configuration illustrated in FIG. 2, the piston 470 is configured to define a chamber 430 with bore 428 and bottom wall 429 and to provide a lost motion travel distance 479 thereby preventing transmission of auxiliary valve events via the first load path. Piston 470 may include an annulus 472 which permits flow of hydraulic fluid from a constant (continuous) supply passage 421 in the rocker arm 420 to the HLA receiving bore 471 and the HLA. A switched fluid supply passage 424 may provide fluid to the bore 428 under control of a control valve 425. Fluid flow from the HLA may be prevented from bore 429 by tight clearances between the piston 470 and the bore 428. A vent 473 may be provided in the piston 470 and a check valve 474 provided therein to facilitate one-way flow to the HLA. In operation, when activation of the auxiliary motion valve is desired, the hydraulic fluid control valve 425 may be switched to provide hydraulic pressure (oil) to chamber 430 and extend the lash adjuster loading assembly (piston 470) and lock it in an extended position, thereby initiating valve braking motion. When the control valve 425 is switched off, the lash adjuster check valve indexes to an "off" position and chamber 430 can vent, by passage of fluid via vent 472 and check valve 474 to permit the brake to be deactivated. As will be recognized, this configuration permits braking motion to be undertaken via the same load path in which the lash adjuster is disposed. This may be used to eliminate the need for an independent (separate) valve actuator, such as an inboard valve actuator described above, to accomplish auxiliary valve motion.

Figure 4B:
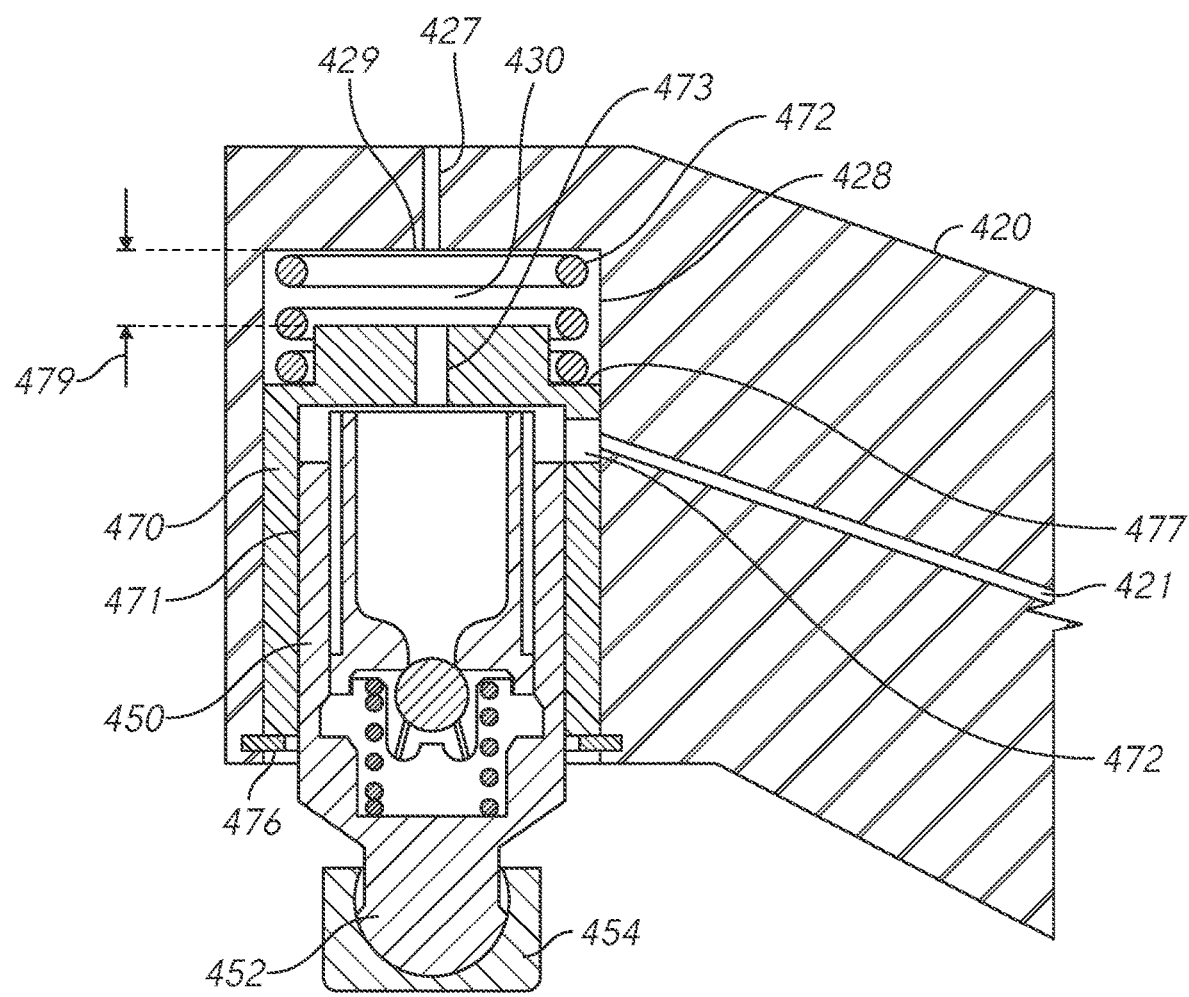
FIG. 4B is a cross-section showing details of yet another implementation of a lash adjuster and lash adjuster loading component in a modified configuration compared to FIG. 4A.

FIG. 4B illustrates an alternative arrangement for a lash adjuster loading component and HLA, according to aspects of the disclosure. In this implementation, features of the stroke limited piston are integrated into the rocker arm rather than the valve bridge (as in FIG. 2). This arrangement permits valve braking motion to be accomplished a second load path in which the lash adjuster is disposed and thus may be used in implementations utilizing an independent valve actuator (inboard valve actuator as described above) for facilitating valve braking motion. A rocker arm 420 may include a bore 428 for receiving a stroke limited piston 470, which in turn includes an HLA-receiving bore 471 for supporting an HLA therein. A travel limiter 476 limits travel (in a downward direction) of piston 470. A compression spring 472 is disposed in the rocker arm bore 428 and engages a shoulder 477 on the piston 470 on one end and a bottom bore wall 429 on another end, providing a compressive force on the HLA against the bridge (not shown) which is engaged by the pivot 452 and pedestal 454. As in the configuration illustrated in FIG. 2, the piston 470 is configured to define a chamber 430 with bore 428 and bottom wall 429 and to provide a lost motion travel distance 479 thereby preventing transmission of auxiliary valve events via the first load path. Piston 470 may include an annulus 472 which permits flow of hydraulic fluid from a constant (continuous) supply passage 421 in the rocker arm 420 to the HLA receiving bore 471 and the HLA. Fluid flow from the HLA may be prevented from bore 429 by tight clearances between the piston 470 and the bore 428. In operation, hydraulic fluid is supplied to the lash adjuster via continuous supply passage 421 and annulus 472. Chamber 430 may be without any hydraulic fluid, i.e., occupied by air. A vent 427 may vent air to the outside environment. Air from the lash adjuster may vent to chamber 430 via vent 473. As will be recognized, this configuration may be utilized in engine environments eliminate where an independent (separate) valve actuator, such as an inboard valve actuator described above, is utilized to accomplish auxiliary valve motion.

As will be recognized by those of ordinary skill in the art, the embodiments described above with regard to FIGS. 2 and 4B may be used in environments where auxiliary motion is applied to at least one valve, with an auxiliary motion source that is separate from the main event motion source. For example, in auxiliary motion systems where auxiliary motion is facilitated by a dedicated rocker arm or bolt-on master slave brake, or any auxiliary motion source that is not necessarily a lost motion main event motion source. The motion of the main event rocker arm may be timed with the auxiliary motion events such that the compression spring (274 in FIG. 2, or 472 in FIG. 4B, for example) remains at least partially compressed during these events, but not fully compressed to the point where lift is provided in positive power or during auxiliary lift events. This prevents extension of the lash adjuster during any auxiliary motion events by preloading the lash adjuster with the main event motion.

Figure 5:
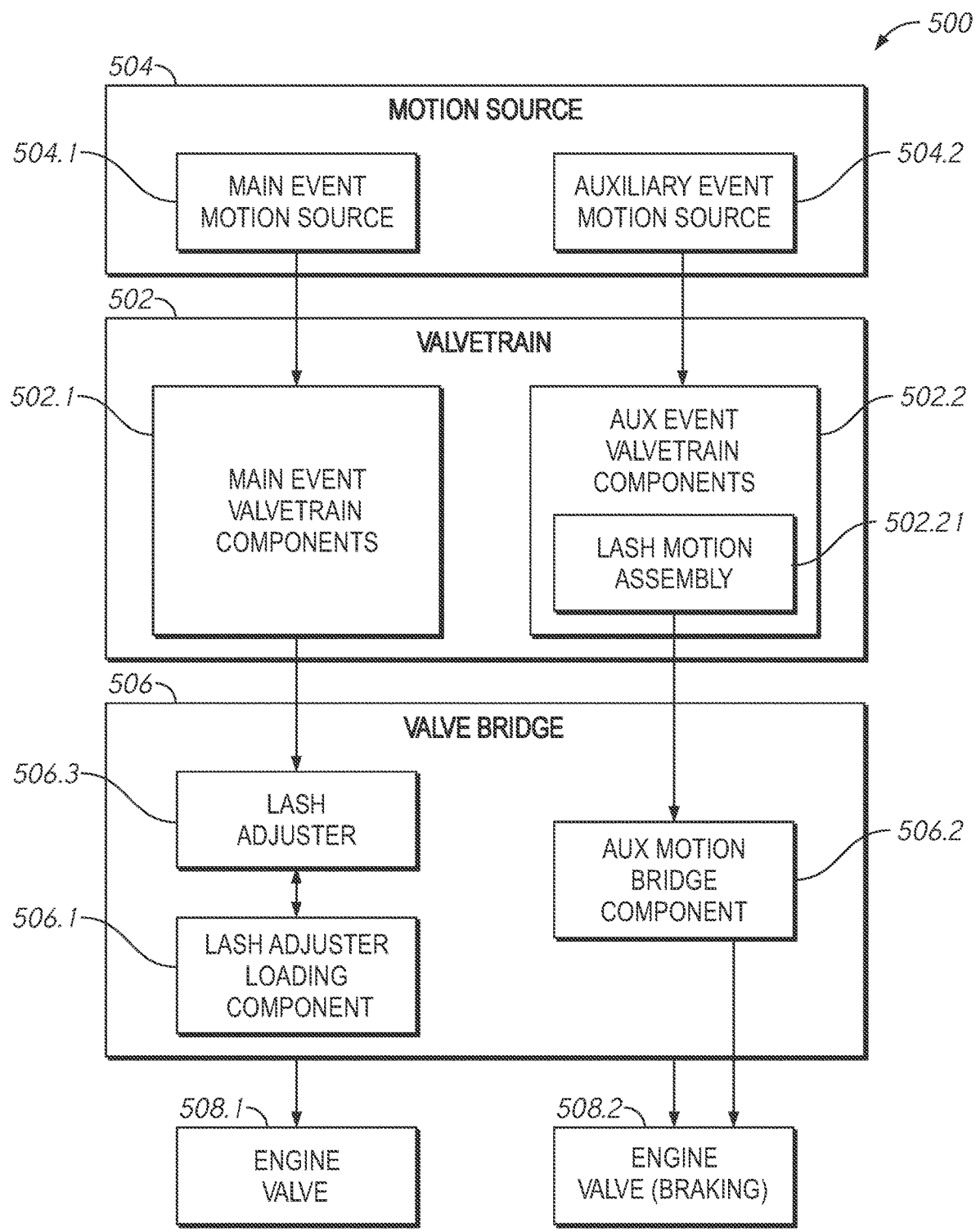
FIG. 5 is a schematic block diagram of a valve actuation system in accordance with further aspects of the disclosure.

FIG. 5 is a schematic block diagram of a valve actuation system 500 according to further aspects of the disclosure. This system is similar to the system described above with regard to FIG. 1. However, some differences relate to the location of the lash adjuster. More specifically, the lash adjuster 506.3 may disposed in the valve bridge 506 along with the lash adjuster loading component 506.1. Valve actuation motion source 504 may include main event motion source components 504.1 and auxiliary event motion source components 504.2. Motion from the motion sources 504.1 and 504.2 is transferred to valvetrain 502, which may comprise main event motion valvetrain components 502.1 and auxiliary event motion valvetrain components 502.2. These component sets may include common elements, such as a single rocker arm. A lost motion assembly 502.21 may be included in the auxiliary event motion valvetrain components 502.2, in which case the component can function as a housing for the lost motion assembly.

The valvetrain components transmit motion to the valve bridge 506, and/or components thereof. A lash adjuster 506.3 and lash adjuster loading component 506.1 may be disposed in the valve bridge 506. An auxiliary motion bridge component 506.2 may be provided as a component to the valve bridge 506 and may include, for example, a bridge pin, which permits transfer of motion from the lost motion assembly 502.21 to a braking engine valve 508.2 without imparting motion to the valve bridge 506. According to an aspect of the disclosure, a lash adjuster loading component 506.1 functions to keep the lash adjuster 506.3 in a loaded state (i.e., with a force against the extended direction of the lash adjuster).

Figure 6:
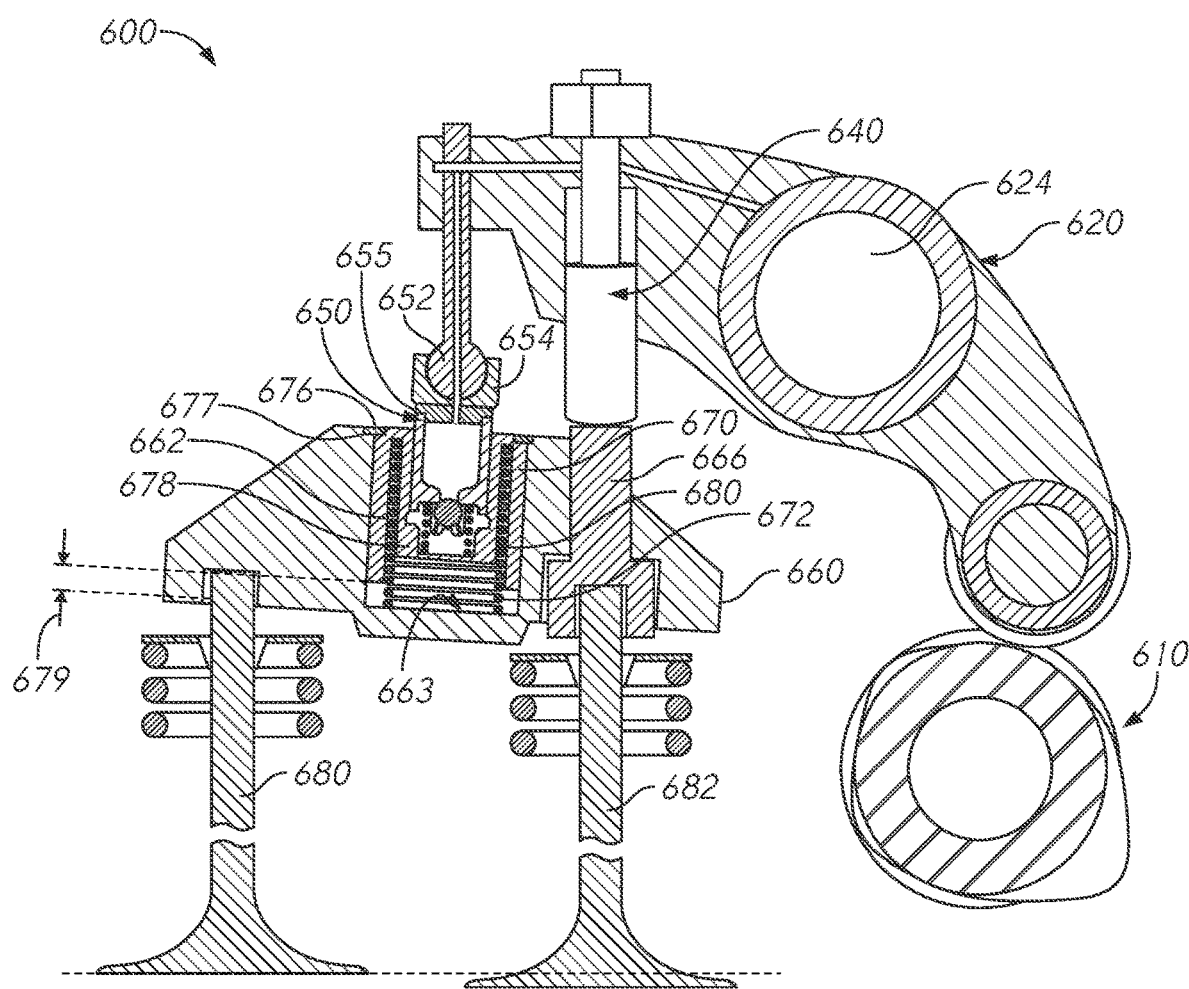
FIG. 6 is a schematic example implementation of a valve actuation system in accordance with the instant disclosure and the system of FIG. 5.

FIG. 6 is a schematic illustration of a valve actuation system 600 in an implementation which is consistent with the functional block diagram of FIG. 5. Rocker arm 620 is driven by lost motion cam 610 and includes an inboard valve actuator 640, which cooperates with a bridge pin 666 to impart motion to a braking valve 682. Rocker arm 620 also includes a static (solid) extended pivot 652 extending from and end thereof and having a swivel or ball. Pivot 652 cooperates with an e-foot pedestal 654 which engages an HLA base 655 to impart motion to an HLA/bridge assembly, as further described. A hydraulic fluid passage 622 may extend through the pivot 652, the pedestal 654 and the rocker arm from the journal to hydraulically actuated components such as the inboard valve actuator 640 and HLA 650.

A stroke-limited piston 670 is mounted within a bore 662 in the valve bridge 660. A shoulder 677 may be provided on an upper surface of the piston for engaging a travel limiter 676 fastened to the bridge 660. Piston 670 also includes an inner annular wall 678 configured for housing the components of the HLA. Annular wall 678 also defines an annular recess 680 which partially houses a compression spring 672 to bias the piston in an upward direction. Compression spring 672 engages a bottom wall 663 of the bridge bore 662 and an upper wall defined within the annular recess 680 of the piston 670. A lost motion gap having a clearance 679 is defined between the bottom end of the piston 670 and the bridge bore bottom wall 663.

In operation, during main event (positive power) motion of the engine, the rocker arm 620 imparts main event motion from the lost motion cam 610 to the valve bridge via pivot 652, pedestal 654 and the HLA 650. The constant compressive forces provided on the bridge-located lash adjuster loading component, which includes the spring piston 670 and related components, operates to ensure that over-extension or "jacking" of the HLA 650 does not occur. During auxiliary motion, when a braking operation is being performed or is active, the motion from the rocker arm 620 is transmitted through the activated inboard valve actuator 640 to the bridge pin 666 and braking valve 682. The motion of the rocker arm, owing to the rocker ratio and respective locations of the inboard actuator and the fulcrum 652 on the rocker arm 620, will result in a larger displacement or stroke of the HLA than the stroke undertaken by the inboard valve actuator. This larger stroke will result in a compressive force from the stroke-limited piston 670 acting against the HLA to thereby prevent overextension. The lost motion function of the HLA mounting configuration, owing to the clearance 679 between the piston 670 and the bridge bore bottom wall 663 will operate to "hide" the auxiliary motion of the rocker arm from the valve bridge 660, and thus the engine valves 680 and 682, it being understood that valve 682 will still undergo movement according to the braking action.

Figure 7:
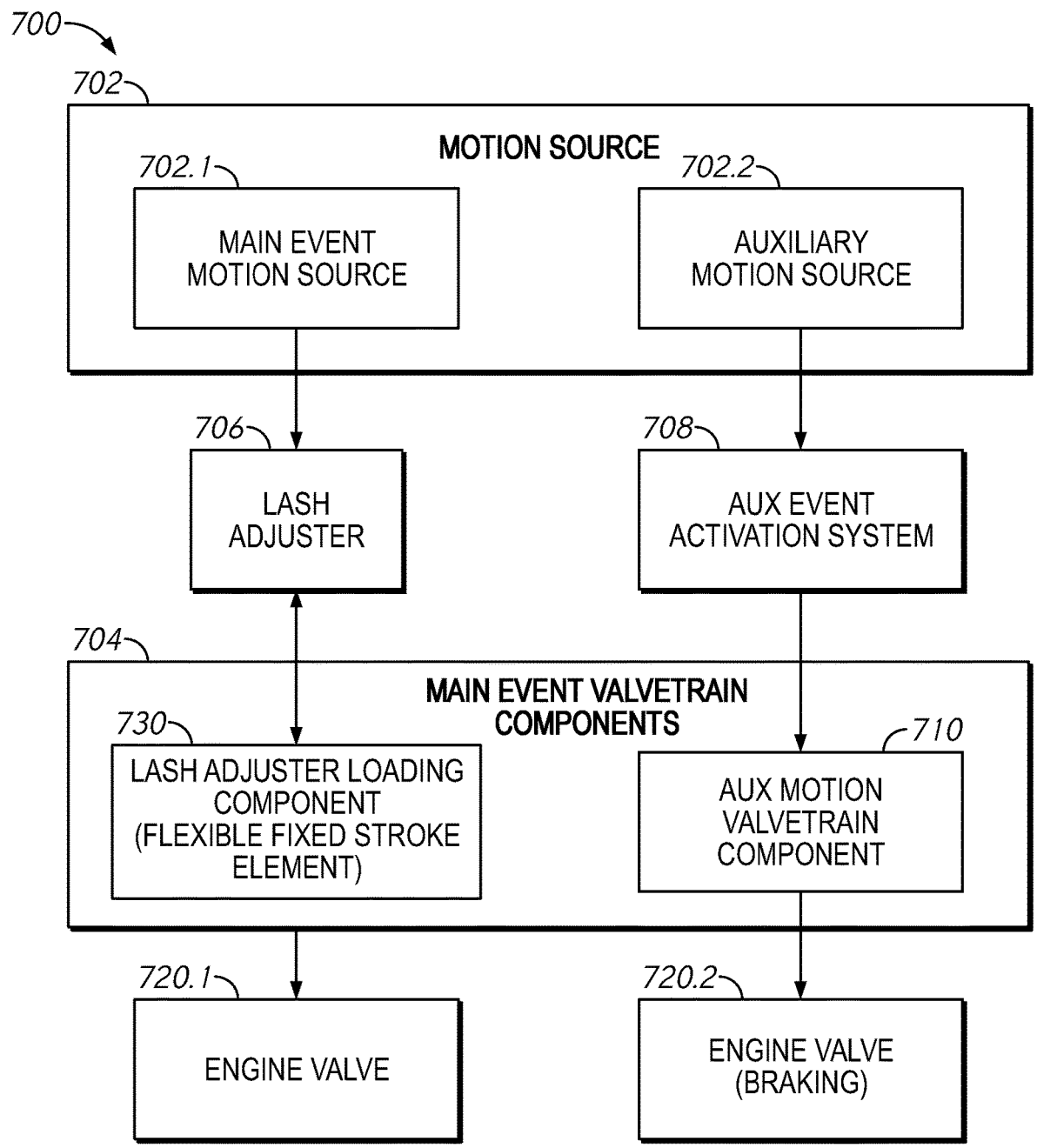
FIG. 7 is a schematic block diagram of a valve actuation system, including a dedicated auxiliary motion source according to a further aspect of the disclosure.

FIG. 7 is a schematic block diagram of a valve actuation system 700 according to aspects of the disclosure. In this example system, motion sources 702 may include a main event motion source 702.1 and an auxiliary motion source 702.2. These motion sources may comprise a cam or other device for causing motion to be imparted through respective load paths, represented by the arrows and schematically-represented components (boxes) in FIG. 7, and ultimately to one or more engine valves 720.1 and 720.2. The main event motion source 702.1 and auxiliary event motion source 702.2 may be separate sources, such as separate cams, including a main event cam and an auxiliary event (dedicated or braking) cam. Main event valvetrain components 704 transmit main event motion (and load) to engine valves 720.1 and 720.1. A lash adjuster 706, which may be hydraulic lash adjuster (HLA), may be disposed in the main event load path in order to take up lash between components in the main event valvetrain. Lash adjuster 706, as will be recognized, may include internal components which provide for the lash adjuster to assume an expanding, semi-rigid state when the valvetrain components are under a relatively low load, and a rigid state when the valvetrain components are under high load, such as during main event valve motion.

Auxiliary motion source 702.2 may transmit motion (and load) through an auxiliary event load path, which may include an auxiliary event activation system 708 which may selectively transmit or absorb motion in the auxiliary event load path to facilitate the occurrence of an auxiliary event valve motion, such as engine braking, in engine valve 720.2. One or more auxiliary motion valvetrain components 710 may be provided as a subset of the main event valvetrain components 704. For example, the main event valvetrain components 704 may include a valve bridge, and the auxiliary motion valvetrain components may include a bridge pin, slidably disposed in the valve bridge, such that the bridge pin transmits main event motion from the bridge during main event valve operation. The bridge pin may move relative to the bridge to transmit auxiliary motion, independent of the bridge main event motion, when the auxiliary event activation system is active to facilitate, for example, engine braking motion in valve 720.2.

According to an aspect of the disclosure, the main event valvetrain components 704 may include a lash adjuster loading component 730 disposed in the main event valvetrain. The lash adjuster loading component 730 interacts with the lash adjuster 706 to prevent over-extension or "jacking" of the lash adjuster 706 during engine operation. More specifically, and as will be further detailed below, the lash adjuster loading component 730 may maintain a biasing force on the lash adjuster during periods of relatively low load, such as during auxiliary events or during transitions to or from auxiliary events. The biasing force will be of a magnitude that is sufficient to counter the lash adjuster hydraulic force and thus prevent over-extension of the lash adjuster. Further, the lash adjuster loading component 730 may permit refill of the lash adjuster 706 and will permit high loads to be transmitted to the main event valvetrain, such as loads present in the main event valvetrain during main event valve operation.

Figure 8:
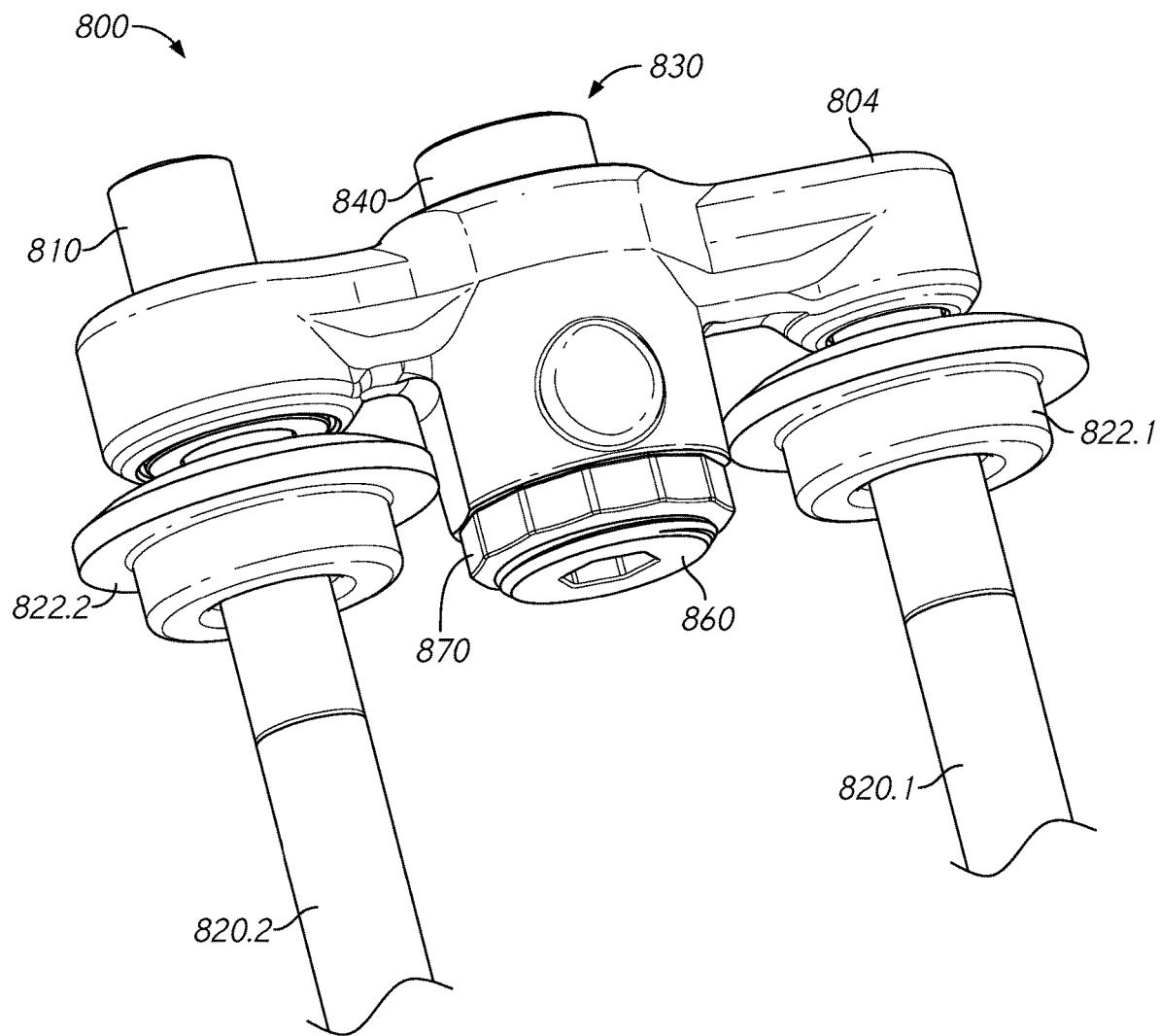
FIG. 8 is a perspective of example valve actuation components that may be used in a dedicated auxiliary motion source system, including a lash adjuster loading component according to aspects of the disclosure.

FIG. 8 is a perspective view showing example components of a valve actuation system 800 according to aspects of the disclosure, including a valve bridge 804 having an integrated lash adjuster loading component 830. While further internal details will be described, FIG. 8 shows a spring-biased piston 840 that extends from the valve bridge 804. An adjusting setscrew 860 and locking nut 870 may be provided to adjust operational parameters of the spring-biased piston, as will be explained. Valve bridge 804 may directly contact the stem of a first engine valve 820.1, extending through a valve guide 822.1. A bridge pin 810 may be housed for sliding motion in a bore in an opposite end of the valve bridge 804 and may interact with the stem of a second engine valve 820.2 to provide for main event and auxiliary motion thereof. Valve 820.2 may extend through a valve guide 822.2.

FIGS. 9.1, 9.2 and 9.3 are cross-sections of the example valve actuation system 800 of FIG. 8, and including a lash adjuster loading component 830 and a lash adjuster 906. These figures show the lash adjuster loading component 830 in three different configurations or "states." Valve bridge 804 may include a piston guiding bore 805 formed in a central portion thereof for housing piston 840 and permitting sliding movement, in a vertical direction relative to FIG. 9.1. Piston 840 may have a generally cylindrical shape and cooperate with a biasing component which, in this example, is in the form of a biasing compression spring 848. Spring 848 may be partially housed in an internal bore 842 of the piston 840 with an upper end of spring 848 seated against a bore end wall 844. Piston 840 may include an annular piston skirt or shoulder 846, which is of a larger diameter than piston guiding bore 805. A valve bridge counterbore 807 may be formed on an underside of the bridge 804 in general axial alignment with the piston guiding bore 805 and having a larger diameter and internal threads 808. Counterbore 807 may define a counterbore end wall 809 in the bridge 804. The counterbore 807 thus accommodates and permits limited travel of the piston annular shoulder 846 therein, it being understood that counterbore end wall 809 provides an upper limit on the travel of the annular shoulder 846, and thus the piston 840, within the valve bridge 804. Setscrew 860 may include external threads 862 which cooperate with counterbore internal threads 808 and may include a setscrew spring seat 864. A lower end of spring 848 may be received in the spring seat 864 with a lower end of spring seated against a seat end wall 866. A setscrew end wall 868 may define a lower limit for the travel of the piston annular shoulder 846. Setscrew 860 may adjust the position of the piston lower limit, as well as the biasing force provided by compression spring 848 on the piston 840.

Figure 11:
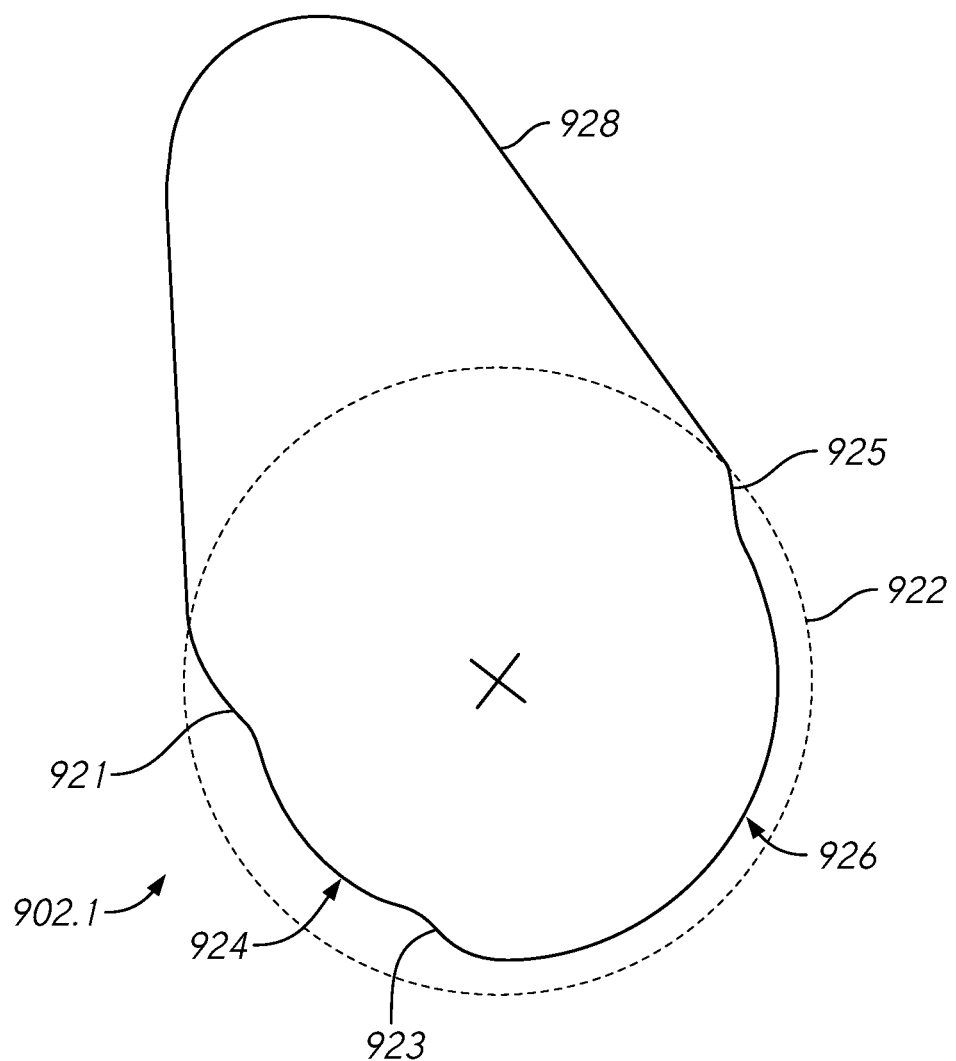
FIG. 11 is a detail of an example cam surface.

FIGS. 9.1, 9.2 and 9.3 depict a hydraulic lash adjuster 906 in cooperating relationship with the spring piston arrangement described above, which operates as a lash adjuster loading component 830 in the valve bridge 804. FIG. 11 is a detail view of the example cam illustrated in FIGS. 9.1, 9.2 and 9.3. Lash adjuster 906 may have an expansion direction, which is the downward direction in the orientation of FIGS. 9.1, 9.2 and 9.3, and a contraction or compression direction, which is the upward direction. As will be recognized, the piston 840 is biased in an upward direction within the valve bridge 804 by the compression spring 848, thus tending to apply the spring force to the lash adjuster 906. The stroke of the piston, however, is limited in both an upward direction, and this biasing force is only applied so long as the piston position is between the stroke limits.

FIG. 9.1 shows the piston 840 in a lash adjuster refill state, in which the piston is at its uppermost limit of travel. Specifically, the piston annular shoulder 846 engages the counterbore end wall 809 to limit upward travel of the piston 840. With the piston 840 in this position, the biasing force of the compression spring 848 is isolated relative to the lash adjuster, and the lash adjuster may expand to take up any lash developed in the valvetrain. Such expansion will cause the lash adjuster to refill with hydraulic control fluid, which is typically circulating within the control system at a predetermined operating pressure. An example main event cam 902.1 is also depicted in FIG. 9.1 with the valvetrain components, such as a cam roller, rocker arm and push rods that may be present between main event cam 902.1 and the HLA 906 represented by dotted line 912. Referring additionally to FIG. 11, a base circle 922 of main event cam 902.1 is represented by a dotted line. The main event cam 902.1 may include a main event lifting surface 928. Main event cam 902.1 also includes operational surfaces for facilitating the HLA refill and spring bridge preloading states of the lash adjuster loading component. An example HLA refill cam surface 924, which may be a sub-base circle surface, may facilitate the lash adjuster loading component 830 assuming an HLA refill state, as will be further explained. The main event cam 902.1 may also include a lash adjuster loading component preload surface 926, which may also be a sub-base circle surface, to facilitate the lash adjuster loading component 830 assuming a lash adjuster loading component preload state, as will also be further explained. As illustrated in FIG. 9.1, the main event cam 902.1 is positioned rotationally such that the main event valvetrain components 912 interact with the HLA refill cam surface 924. As further detailed in FIG. 11, main event cam 902.1 may include first, second and third transition surfaces 921, 923 and 925 between the main event surface 928, HLA refill cam surface 924 and the lash adjuster loading component preload surface 926. As will be recognized, cam 902.1 may rotate in a clockwise direction to facilitate the main event motion, HLA refill and lash adjuster loading component motions in the main event valvetrain as will be described further herein.

FIG. 9.2 shows the piston 840 in a preload state, with the preload cam surface 926 of the main event cam 902.1 interacting with the main event valvetrain components 912. In this preload state, the piston annular shoulder 846, and thus the piston 840 are positioned within the piston guiding bore 805 in between the upper limit (counterbore end wall 809) and the lower limit (setscrew end wall 868). Thus, the biasing force of the spring 848 is exerted against the lash adjuster 906, keeping the lash adjuster in a preloaded state and preventing the lash adjuster 906 from over extending. This state of the piston 840 will typically be assumed during auxiliary events, such as braking, in which the auxiliary motion source 902.2 applies force to the bridge pin 810 through an auxiliary valvetrain (not fully shown in FIG. 9.2, except for the bridge pin). When the bridge pin 810 displaces downward, the valve bridge 804 may tilt or pivot about the stem of valve 820.1, it being understood that valve 820.1 may remain in the same position (i.e., closed) during an auxiliary event. Pivoting of the valve bridge 804 tends to move the center of the valve bridge down. The lash adjuster loading component—piston 840—may thus apply the biasing force of the spring 848 and prevent the lash adjuster from over-extending.

FIG. 9.3 shows the piston 840 in a main event motion state, with a main event lift surface 928 of main event cam 902.1 interacting with the main event valvetrain components 912. In this state, the piston annular shoulder 846 and thus the piston 840 are "bottomed out" at the lower extent of the stroke within the valve bridge 804. Specifically, the piston annular shoulder 846 engages the setscrew end wall 868. This state permits the transfer of high loads (through the piston 840 to the valve bridge 804) typically associated with main event actuation of the engine valves 820.1 and 820.1. During this state, because the lash adjuster 906 is under a high load due to the main event provided by the main event lift surface 928, the lash adjuster 906 is maintained in a rigid state and otherwise unable to expand.

Figure 10:
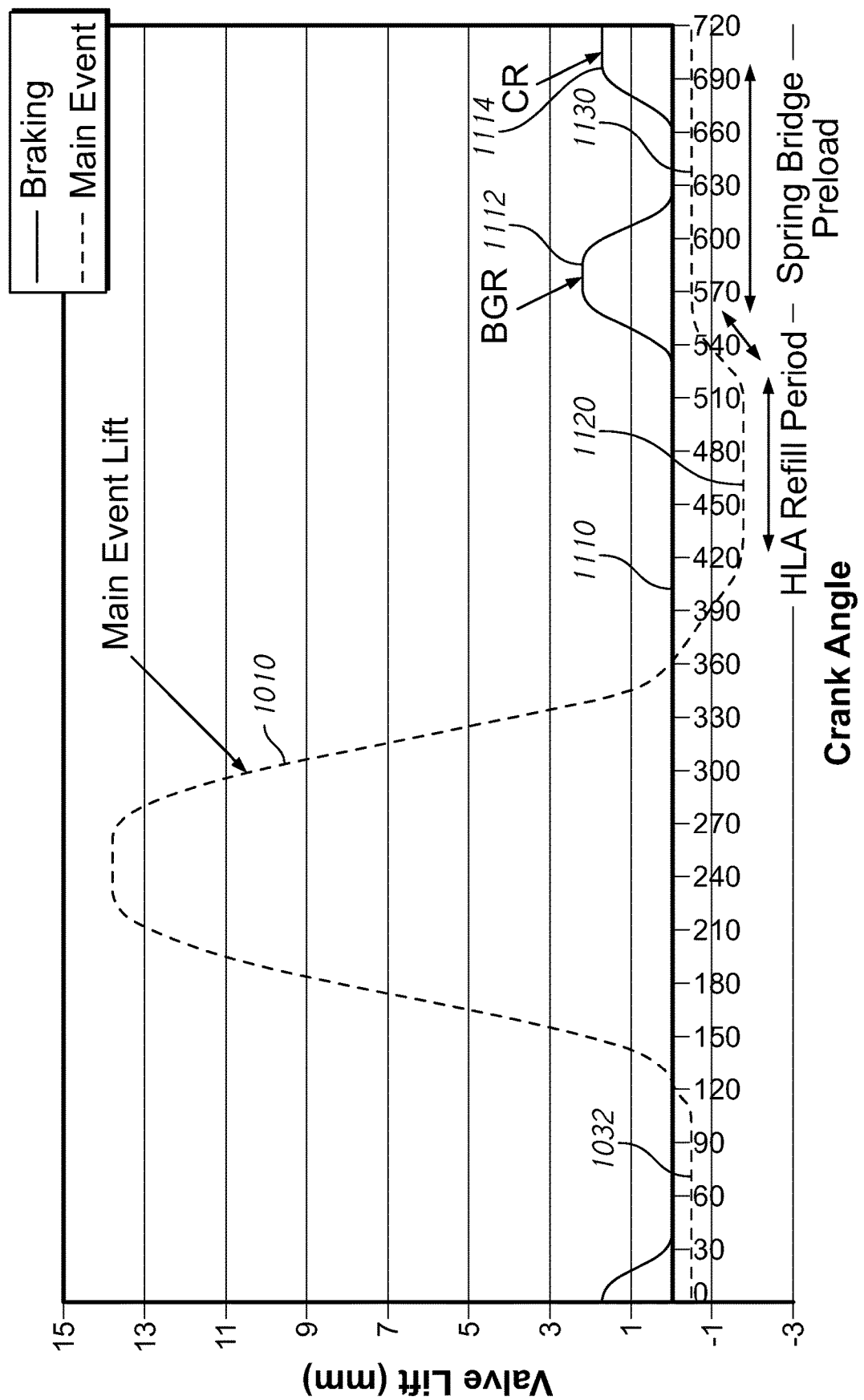
FIG. 10 is a graphical representation of an example operation of the valve actuation system of FIG. 8, showing respective main event and auxiliary event (braking) valve lift as a function of crankshaft angle.

FIG. 10 is a graphical representation depicting example operational characteristics and sequencing of the valve actuation system of FIG. 8. This figure represents main event and auxiliary event (braking) valve motion (lift) as a function of crankshaft angle. The main event valvetrain motion is shown by the dotted line. Auxiliary event valvetrain motion 1110 is shown by the solid line and, it should be noted, coincides with the zero valve lift axis (x-axis) from about 30 degrees to about 530 degrees of crankshaft angle. In an embodiment, the main event and auxiliary event lifts are provided by two separate motion sources, e.g., a main event cam as illustrated in FIGS. 9.1-9.3 and a separate and dedicated auxiliary cam via separate load paths and valvetrain components.

FIG. 10 shows two auxiliary valve events occurring in the auxiliary valvetrain resulting in lift of one or more valves (for example, valve 820.2 via bridge pin 810 in FIG. 9.1). A brake gas recirculation (BGR) event 1112 may occur from about 530 degrees to about 620 degrees of crankshaft angle. A compression release (CR) braking event 1114 may occur from about 665 degrees of crankshaft angle to about 30 degrees of crankshaft angle (i.e., into the beginning of the next engine cycle). Those skilled in the art will appreciate that any of a number of other auxiliary events, as alternatives to or in addition to those illustrated in FIG. 10, may be employed.

According to aspects of the disclosure, the lash adjuster loading component may provide controlled loading of the lash adjuster in the main event valvetrain. The lash adjuster loading component may provide for the occurrence of lash adjuster refill following main event lift and prior to the occurrence of auxiliary events 1112 and 1114. More specifically, still referring to FIG. 10, following the main lift event, beginning at about 360 degrees to about 420 degrees, the lash adjuster loading component transitions to a lash adjuster refill period or phase 1120, which extends from about 420 degrees to about 520 degrees. It will be recognized that the main event valvetrain motion 1010 during this phase may be implemented by a sub-base circle surface on a main event cam, as depicted by the dotted line being in the negative valve lift region in FIG. 10. It will further be recognized that the duration of the refill period may be controlled by appropriate configuration of the main event motion source, such as the main event cam surface, which may be provided with a refill cam surface (924 in FIG. 9.1) thereon to cause the lash adjuster loading component to assume a refill state as described above. Sub-base circle motion will typically cause lash to arise in the main event valvetrain. During this phase, the lash adjuster loading component will assume the lash adjuster refill state depicted in FIG. 9.1, where stroke of the piston 840 is restrained by the upper limit (bore end wall 809). In this state, the lash adjuster loading component will allow for refill of the lash adjuster following main event motion and prior to the auxiliary events.

According to further aspects of the disclosure, the lash adjuster loading component may ensure that over-extension or "jacking" of the lash adjuster during auxiliary events does not occur. With continued reference to FIG. 10, prior to the onset of auxiliary events 1112 and 1114, at about 520 degrees of crankshaft angle, the lash adjuster loading component may transition from the refill phase 1120 to the preload period or phase 1130. It will be recognized that the main event valvetrain motion during this phase may be implemented by a sub-base circle surface on the main event cam, as depicted by the dotted line being in the negative valve lift region in FIG. 10. However, the preload phase sub-base circle cam surface may typically be of higher elevation (radial distance) from the cam rotational axis than the refill cam surface, which causes lash adjuster loading component to be in a state where the piston 840 (FIG. 9.1) is between the upper and lower stroke limits and thus permitted to apply the biasing force of compression spring 848 to the lash adjuster. The timing of the preload phase and the transition thereto may be achieved by appropriate control surfaces on the main event motion source, such as the main event cam, which may include a preload cam surface (926 in FIG. 9.1). During this phase, the lash adjuster loading component will be in the preload state depicted in FIG. 9.2 where the piston 840 maintains a biasing force against the lash adjuster, thus keeping the lash adjuster from over-extending. The preload state may continue beyond the 720-degree crank angle an into the next engine power cycle as shown in FIG. 10 with the preload state continuing at 1032, beyond the termination of the CR event and for about 120 degrees of crank angle into the new engine cycle. As will be recognized from this disclosure, the duration of the preload state may extend for at least as long as the duration of any auxiliary events. While in the above example, two auxiliary events occur in succession and the duration of a single preload event extends across the duration of both auxiliary events, the present disclosure also contemplates the preload occurring at intermittent times in a given engine cycle to coincide with the separate respective durations of multiple auxiliary events. As will be recognized from this disclosure, the biasing force provided by the biasing component in the lash adjuster loading component, such as the compression spring 848 should be of suitable degree so as to counteract the any forces in the lash adjuster, such as force arising from hydraulic pressure in the lash adjuster.

As will be recognized from the present disclosure, timing and duration of the main event, HLA refill and preload states of the lash adjuster loading component may be controlled by appropriately configuring the aforementioned operational parameters, including the refill and preload cam surfaces on the main event cam, as well as configuring the stroke limits on the lash adjuster loading component. It will further be recognized that the piston stroke should be matched substantially to the translated distance between the HLA refill surface on the main event cam and the desired main event opening and closing position on the main event cam in order to ensure optimal refilling of the HLA and to achieve other benefits.

Figure 12:
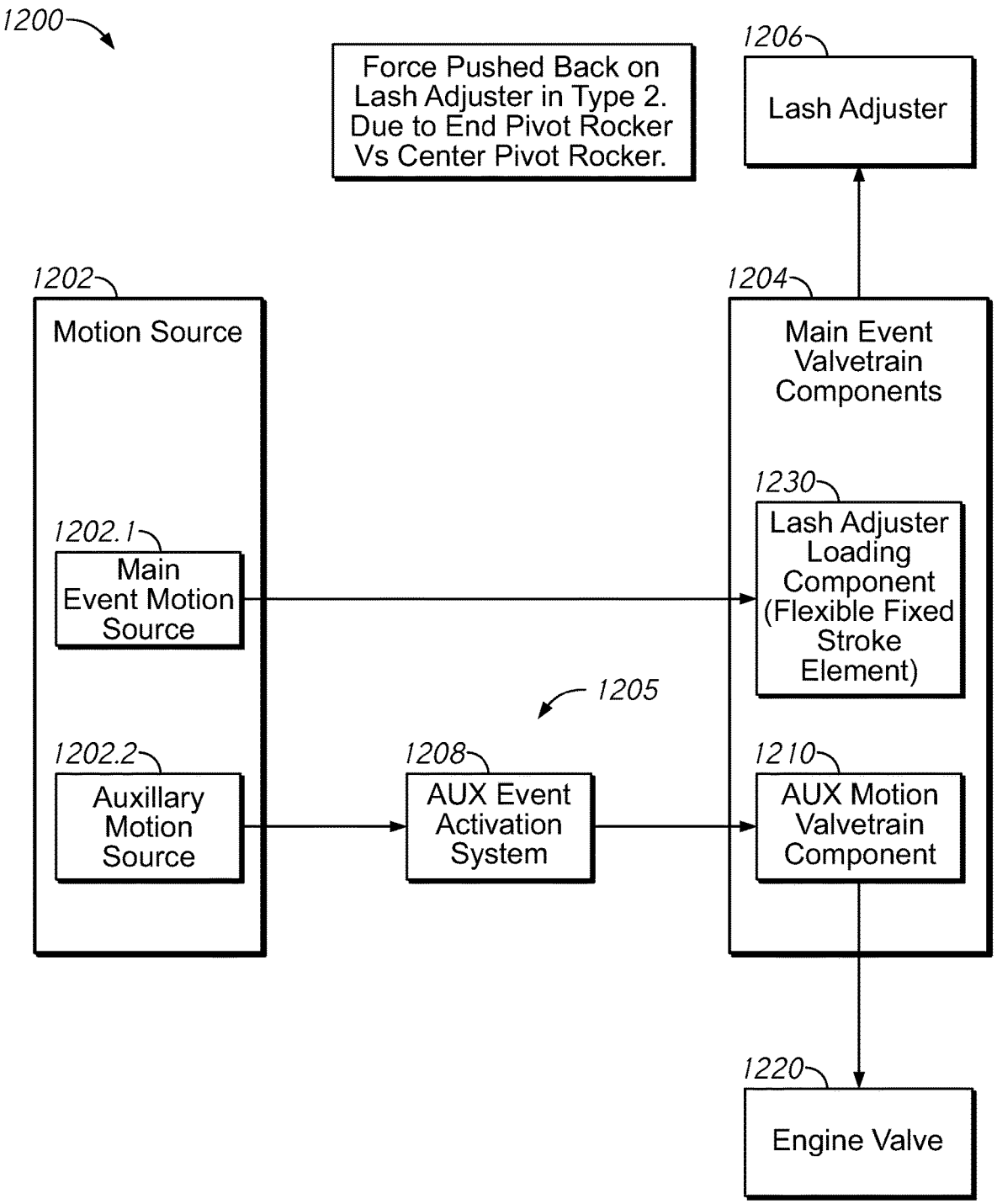
FIG. 12 is a schematic representation of a valve actuation system 1200 according to aspects of the disclosure relating to Type II valve architectures.

FIG. 12 is a schematic representation of a valve actuation system 1200 relating to Type II valve architectures, according to aspects of the disclosure. In this example system, motion sources 1202 may include a main event motion source 1202.1 and an auxiliary motion source 1202.2. These motion sources may comprise a cam or other device for causing motion to be imparted through respective load paths, represented by the arrows and schematically-represented components (boxes) in FIG. 12, and ultimately to engine valve 1220. The main event motion source 1202.1 and auxiliary event motion source 1202.2 may be separate sources, such as separate cams, including a main event cam and an auxiliary event (dedicated or braking) cam. Main event valvetrain components 1204 transmit main event motion (and load) to engine valve 1220. A lash adjuster 1206, which may be hydraulic lash adjuster (HLA), may be disposed in an end pivot for a rocker and thus not be directly disposed in the main event load path. In other words, the HLA may be parallel to the main event load path and provide a reaction force to the main event load in order to take up lash between components in the main event valvetrain.

Auxiliary motion source 1202.2 may transmit motion (and load) through an auxiliary event load path 1205, which may include an auxiliary event activation system 1208 which may selectively transmit or absorb motion in the auxiliary event load path to facilitate the occurrence of an auxiliary event valve motion, such as engine braking, in engine valve 1220. One or more auxiliary motion valvetrain components 1210 may be provided as a subset of the main event valvetrain components 1204. For example, the main event valvetrain components 1204 may include an end pivot rocker, and the auxiliary motion valvetrain components 1210 may include the same end pivot rocker.

According to an aspect of the disclosure, the main event valvetrain components 1204 may include a lash adjuster loading component 1230 disposed in the main event valvetrain. The lash adjuster loading component 1230 interacts with components in the main event valvetrain to prevent over-extension or "jacking" of the lash adjuster 1206, which may be disposed in the main event valvetrain, in various embodiments as will be further described. More specifically, and as will be further detailed below, the lash adjuster loading component 1230 may act on components in the valvetrain to cause a biasing force on the lash adjuster during periods of relatively low load, such as during auxiliary events or during transitions to or from auxiliary events. Further, the lash adjuster loading component 1230 may permit refill of the lash adjuster 1206 and will permit high loads to be transmitted to the main event valvetrain, such as loads present in the main event valvetrain during main event valve operation.

Figure 13:
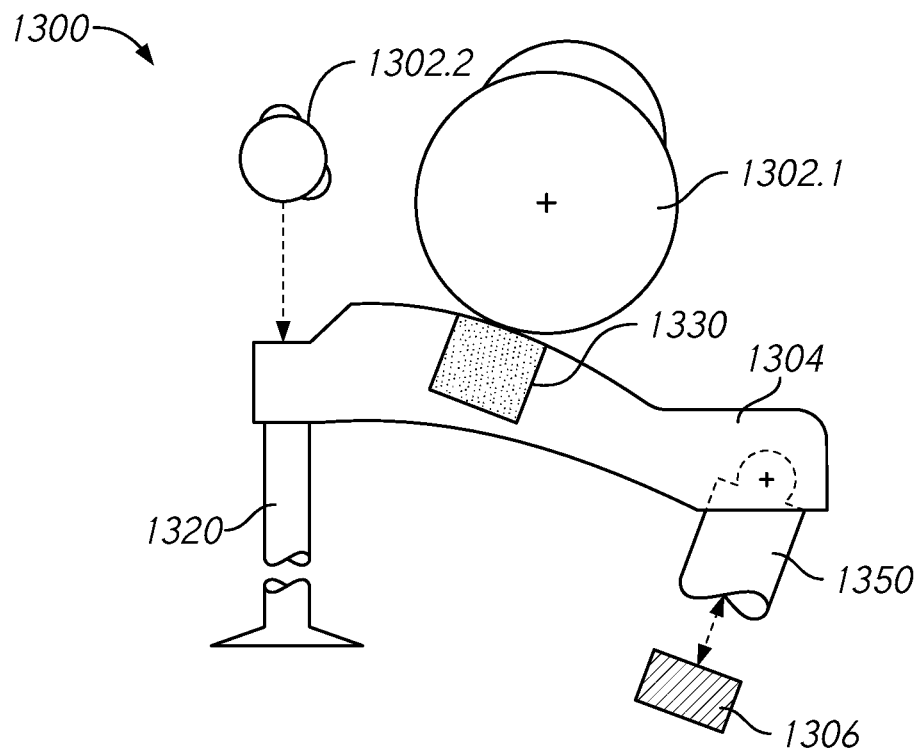
FIG. 13 is a schematic representation of a first example lash adjuster loading component arrangement in a Type II valve architecture.

FIG. 13 is a schematic representation of a first example lash adjuster loading component arrangement 1300 in a Type II valve architecture. Main event motion source may be a cam 1302.1 which operates on an intermediate area of a rocker 1304, which may be of a type known as a finger follower, which is mounted on a pivot 1350. An auxiliary motion source 1302.2, which may be an auxiliary (dedicated) cam, separate from the main event cam 1302.1, may act on the rocker 1304 through auxiliary valvetrain components illustrated as a dotted line in FIG. 13 for ease of illustration. While illustrated separate from the main event cam, auxiliary cam may be on the same camshaft as the main event cam and may operate on the same area (i.e., middle or intermediate region) of the rocker 1304. Rocker 1304 operates on valve 1320. A lash adjuster 1306 may cooperate with or be integrated with the pivot 1350 so as to take up lash existing between the rocker and main event motion source 1302.1. A lash adjuster loading component 1330 may be disposed in or cooperate with the rocker 1304 to react against both the main event motion source 1302.1 and the rocker 1304 to maintain a load on the lash adjuster 1306 and thereby prevent overextension thereof. As will be recognized, the internal components of the lash adjuster loading component 1330 may provide a spring loaded, stroke limited function as described above, such that the lash adjuster 1306 is maintained in a controlled position during main and auxiliary events. Further, main event cam 1302.1 may be provided with the sub-base circle regions to implement the HLA refill and preloading functions as described above with reference to FIGS. 9.1-9.3, 10 and 11.

Figure 14:
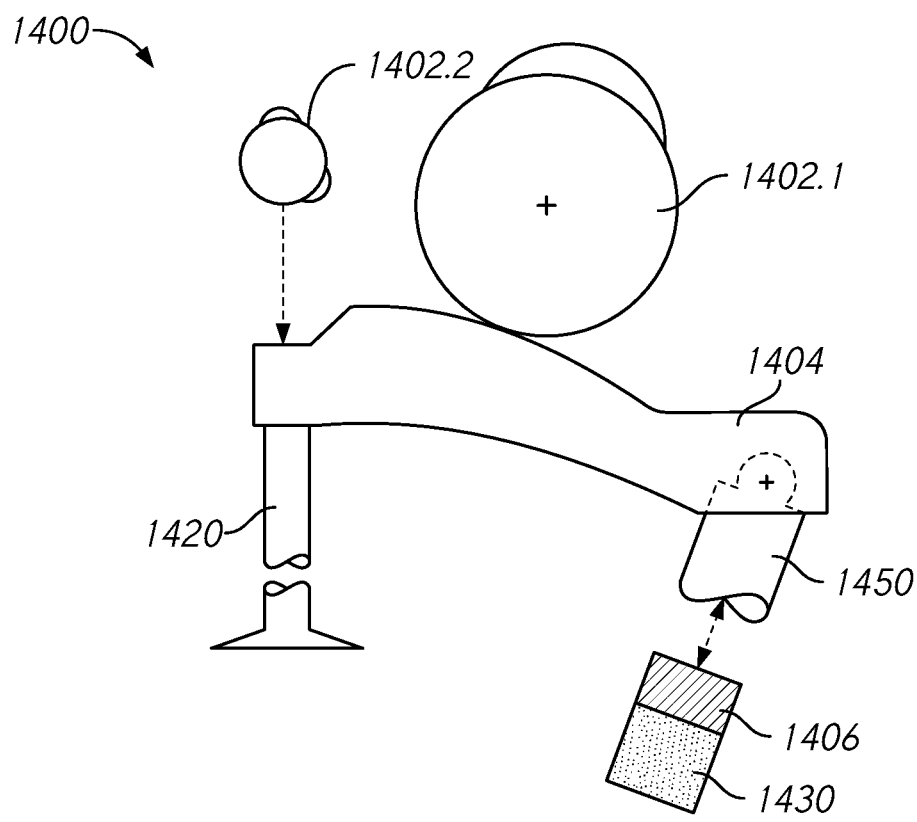
FIG. 14 is a schematic representation of a second example lash adjuster loading component arrangement in a Type II valve architecture.

FIG. 14 is a schematic representation of a second example lash adjuster loading component arrangement 1400 in a Type II valvetrain architecture. Main event motion source may be a cam 1402.1 which operates on an intermediate area of a rocker 1404, which may be of a type known as a finger follower, which is mounted on a pivot 1450. An auxiliary motion source 1402.2, which may be an auxiliary (dedicated) cam, separate from the main event cam 1402.1, may act on the rocker 1404 through auxiliary valvetrain components illustrated as a dotted line in FIG. 14 for ease of illustration. While illustrated separate from the main event cam, auxiliary cam may be on the same camshaft as the main event cam and may operate on the same area (i.e., middle or intermediate region) of the rocker 1404. Rocker 1404 operates on valve 1420. A lash adjuster 1406 may cooperate with or be integrated with the pivot 1450 so as to take up lash existing between the rocker and main event motion source 1402.1. A lash adjuster loading component 1430 may be disposed adjacent to and/or may cooperate with lash adjuster 1406 to react against a stationary part of the engine and the lash adjuster 1406 to maintain a load on the lash adjuster 1406 and thereby prevent overextension thereof. As will be recognized, the internal components of the lash adjuster loading component 1430 may provide a spring loaded, stroke limited function as described above, such that the lash adjuster 1406 is maintained in a controlled position during main and auxiliary events. As will be recognized, main event cam 1402.1 may be provided with the sub-base circle regions to implement the HLA refill and preloading functions as described above with reference to FIGS. 9.1-9.3 and 10.

Figure 15:
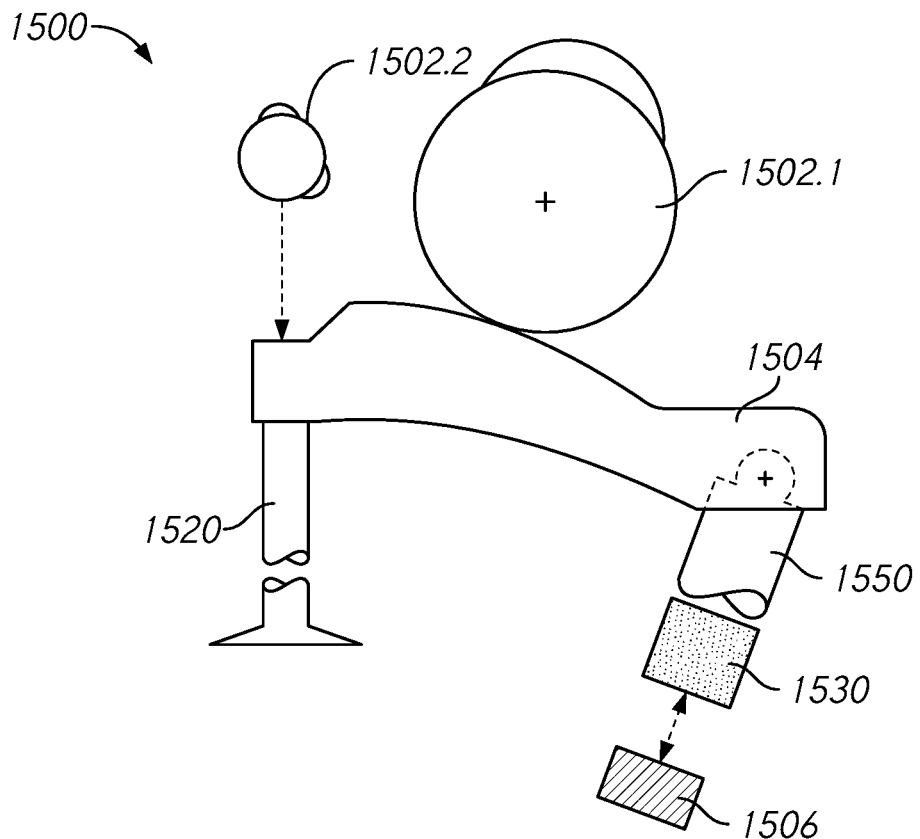
FIG. 15 is a schematic representation of a third example lash adjuster loading component arrangement in a Type II valve architecture.

FIG. 15 is a schematic representation of a third example lash adjuster loading component arrangement 1500 in a Type II valve architecture. Main event motion source may be a cam 1502.1 which operates on an intermediate area of a rocker 1504, which may be of a type known as a finger follower, which is mounted on a pivot 1550. An auxiliary motion source 1502.2, which may be an auxiliary (dedicated) cam, separate from the main event cam 1502.1, may act on the rocker 1504 through auxiliary valvetrain components illustrated as a dotted line in FIG. 15 for ease of illustration. While illustrated separate from the main event cam, auxiliary cam may be on the same camshaft as the main event cam and may operate on the same area (i.e., middle or intermediate region) of the rocker 1404. Rocker 1504 operates on valve 1520. A lash adjuster 1506 may cooperate with the pivot 1550 so as to take up lash existing between the rocker and main event motion source 1502.1. A lash adjuster loading component 1530 may be interposed between the lash adjuster 1506 and the pivot 1550 to maintain a load on the lash adjuster 1506 and thereby prevent overextension thereof. As will be recognized, the internal components of the lash adjuster loading component 1530 may provide a spring loaded, stroke limited function as described above, such that the lash adjuster 1506 is maintained in a controlled position during main and auxiliary events. As will be recognized, main event cam 1502.1 may be provided with the sub-base circle regions to implement the HLA refill and preloading functions as described above with reference to FIGS. 9.1-9.3 and 10.

Figure 16:
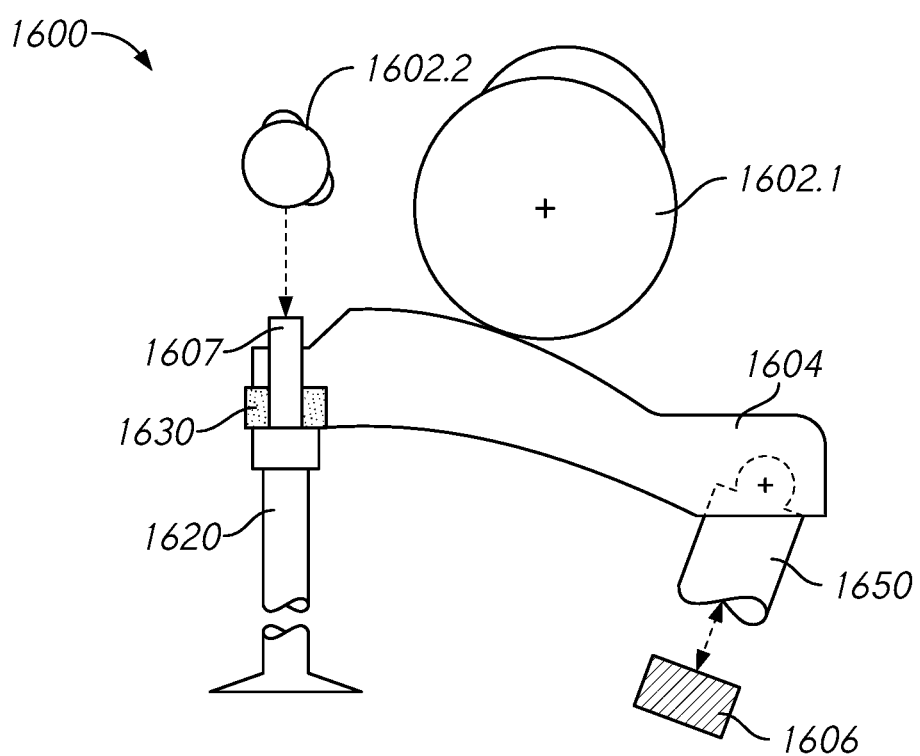
FIG. 16 is a schematic representation of a fourth example lash adjuster loading component arrangement in a Type II valve architecture.

FIG. 16 is a schematic representation of a fourth example lash adjuster loading component arrangement 1600 in a Type II valve architecture. Main event motion source may be a cam 1602.1 which operates on an intermediate area of a rocker 1604, which may be of a type known as a finger follower, which is mounted on a pivot 1650. An auxiliary motion source 1602.2, which may be an auxiliary (dedicated) cam, separate from the main event cam 1602.1, may act on the rocker 1604 through auxiliary valvetrain components illustrated as a dotted line in FIG. 16 for ease of illustration. While illustrated separate from the main event cam, auxiliary cam may be on the same camshaft as the main event cam and may operate on the same area (i.e., middle or intermediate region) of the rocker 1604. Rocker 1604 operates on valve 1620. A lash adjuster 1606 may cooperate with or be integrated with the pivot 1650 so as to take up lash existing between the rocker and main event motion source 1602.1. A sliding pin 1607 may be disposed in the rocker 1604. A lash adjuster loading component 1630 may be located in the rocker 1604 at the rocker to sliding pin location to maintain a load on the lash adjuster 1606 and thereby prevent overextension thereof. As will be recognized, the internal components of the lash adjuster loading component 1630 may provide a spring loaded, stroke limited function as described above, such that the lash adjuster 1606 is maintained in a controlled position during main and auxiliary events. As will be recognized, main event cam 1602.1 may be provided with the sub-base circle regions to implement the HLA refill and preloading functions as described above with reference to FIGS. 9.1-9.3 and 10. The fixed stroke lash adjuster loading component 1630 may bias the sliding pin 1607 away from a rocker to pin contact surface and may provide a fixed stroke. This may allow the lash adjuster 1606 to set lash with the rocker on base circle without compressing the lash adjuster loading element off of its stop. During auxiliary motion, the rocker arm is pressed against the lash adjuster loading element by a lift event on the main event cam profile. When the auxiliary motion source 1602.2 opens the valve by acting on the sliding pin 1606 the lash adjuster loading element is maintained in a compressed state relative to the rocker arm, and prevents the HLA from over extending. Pin 1607 may be provided with biasing structure and stroke limiting structure such as that described above with regard to the spring piston in FIGS. 9.1, 9.2 and 9.3 and may be biased away from the valve end of rocker 1604 a fixed stroke with a spring force sufficient to prevent extension of the HLA 1606. During the preloading period on the main event cam, this spring may be partially compressed so that when the pin 1607 is moved downward by the 1602.2 motion source, the spring 1602 remains in a compressed state and prevents extension of the HLA 1606.

Figure 17:
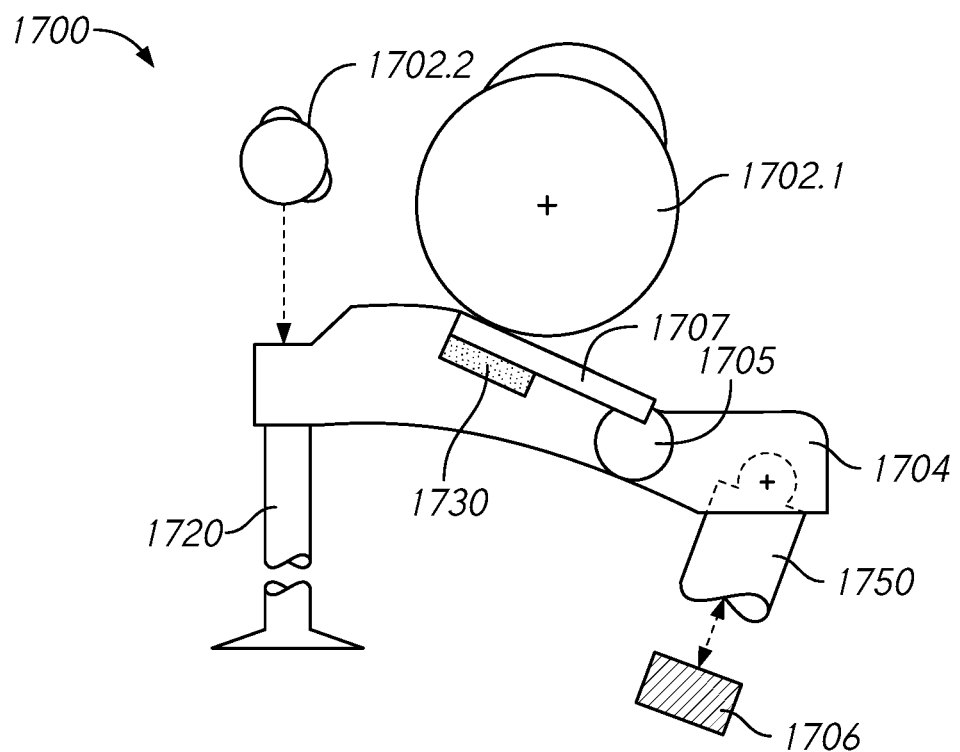
FIG. 17 is a schematic representation of a fifth example lash adjuster loading component arrangement in a Type II valve architecture.

FIG. 17 is a schematic representation of a fifth example lash adjuster loading component arrangement 1700 in a Type II valve architecture. Main event motion source may be a cam 1702.1 which operates on an intermediate area of a rocker 1704, which may be of a type known as a finger follower, which is mounted on a pivot 1750. An auxiliary motion source 1702.2, which may be an auxiliary (dedicated) cam, separate from the main event cam 1702.1, may act on the rocker 1704 through auxiliary valvetrain components illustrated as a dotted line in FIG. 17 for ease of illustration. While illustrated separate from the main event cam, auxiliary cam may be on the same camshaft as the main event cam and may operate on the same area (i.e., middle or intermediate region) of the rocker 1704. Rocker 1704 operates on valve 1720. A lash adjuster 1706 may cooperate with the pivot 1750 so as to take up lash existing between the rocker and main event motion source 1702.1. Rocker 1704 may include a pivot arm 1707 mounted to a pivot point 1705 thereon. A lash adjuster loading component 1730 may be located at the rocker to pivot arm location and may include internal structure, similar to that described above with regard to the stroke-limited spring piston in the embodiment in FIGS. 9.1, 9.2 and 9.3. Moreover, the stroke may be adjusted using a setscrew similar to that shown in those figures. The fixed stroke lash adjuster loading component 1730 may bias the pivot arm 1707, which includes a contact surface with main event cam 1702.1. The pivot point 1705 may operatively engage the rocker 1704 and may also include a rolling element (not shown) that may have a fixed stroke allowing the HLA to refill when the pivot arm is in a fully extended state and the main event cam 1702.1 is oriented such that the lash adjuster refill phase of the main event cam is operating on the pivot arm 1707. When the lash adjuster loading component 1730 is in its fully compressed state, it allows the main event cam 1702.1 to impart main event lift. When the lash adjuster loading component 1730 is partially compressed during the "preloading period" of the main event cam, it allows motion from main event cam 1702.2 to move the rocker body 1704 downward, without losing pre-load on the HLA The lash adjuster loading component 1730 may thus bias the pivot arm 1707 away from the rocker and towards the cam a fixed stroke. This may allow the lash adjuster 1706 to set lash with the rocker on base circle without compressing the lash adjuster loading component 1730 off of its stop. During auxiliary motion, the rocker arm 1704 is pressed against the lash adjuster loading component 1730 by a lift event on the main event cam 1702.1 acting on the pivot arm 1707. When the auxiliary motion source 1702.2 opens the valve 1720 by acting on the rocker 1704 (with or without a sliding pin), the lash adjuster loading component 1730 is maintained in a partially compressed state relative to the rocker arm, and prevents the lash adjuster 1706 from over extending. Pivot arm 1707 may contain a rolling element, flat surface, or curved contact surface. As will be recognized, main event cam 1702.1 may be provided with the sub-base circle regions to implement the lash adjuster refill and preloading functions as described above with reference to FIGS. 9.1-9.3, 10 and 11.

Although the present implementations have been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for actuating at least one of two or more engine valves in an internal combustion engine, comprising:
   a main event motion source adapted to provide main event motion to the at least one engine valve;
   a main event valvetrain for transmitting motion from the main event motion source to the valve through a first load path;
   an auxiliary event motion source, separated from the main event motion source;
   an auxiliary event valvetrain for transmitting motion from the auxiliary motion source to one or more engine valves through a second load path;
   a lash adjuster cooperatively associated with the first load path and adapted to take up lash in the main event valvetrain during the main event motion of the at least one engine valve;
   a lash adjuster loading component cooperatively associated with the first load path and arranged to prevent over-extension of the lash adjuster.

2. The apparatus of claim 1, wherein the lash adjuster loading component comprises a biasing component, and wherein the main event motion source includes a main event cam, the main event cam having a main event cam surface defining main event motion in the main event valvetrain and a preload cam surface defining preload motion in the main event valvetrain wherein the lash adjuster loading component applies a biasing force to the lash adjuster.

3. The apparatus of claim 2, wherein the auxiliary event motion source comprises an auxiliary event cam, the auxiliary event cam having an auxiliary event cam surface that defines at least one auxiliary valve event, and wherein the preload motion in the main event valvetrain occurs during at least one auxiliary valve event.

4. The apparatus of claim 3, wherein the main event motion source is configured to cause the preload motion in the lash adjuster loading component for the duration of at least one auxiliary event.

5. The apparatus of claim 1, wherein the main event load path includes a valve bridge and wherein the lash adjuster loading component comprises a piston cooperatively associated with the valve bridge.

6. The apparatus of claim 1, wherein the lash adjuster loading component comprises a stroke limiting component for limiting stroke of the lash adjuster loading component in a lash adjuster compression direction.

7. The apparatus of claim 1, wherein the lash adjuster loading component comprises a stroke limiting component for limiting the stroke of the lash adjuster loading component in a lash adjuster expansion direction.

8. The apparatus of claim 5, wherein the lash adjuster loading component has a stroke limiting component comprising an annular shoulder on the piston.

9. The apparatus of claim 8, wherein the stroke of the lash adjuster loading component is substantially equal to the translated distance between a lash adjuster refill period and a main event opening and closing position on the main event motion source.

10. The apparatus of claim 1, wherein the main event motion source includes a main event cam surface defining main event motion in the main event valvetrain, and a lash adjuster refill cam surface that defines lash adjuster refill motion in the main event valvetrain, which permits refill of the lash adjuster.

11. The apparatus of claim 10, wherein the main event cam includes a preload cam surface defining preload motion in the main event valvetrain wherein the lash adjuster loading component applies a biasing force to the lash adjuster.

12. The apparatus of claim 11, wherein auxiliary motion source includes an auxiliary cam, the auxiliary cam having an auxiliary cam surface that defines at least one auxiliary event, wherein the main event motion source and auxiliary motion source cooperate such that the lash adjuster refill motion begins prior to the at least one auxiliary event during at least one operating cycle of the internal combustion engine.

13. The apparatus of claim 11, wherein auxiliary motion source includes an auxiliary cam, the auxiliary cam having an auxiliary cam surface that defines at least one auxiliary event, wherein the main event motion source and auxiliary motion source cooperate such that the lash adjuster preload motion is applied during the at least one auxiliary event during at least one operating cycle of the internal combustion engine.

14. The apparatus of claim 1, wherein the lash adjuster loading component comprises:
a piston cooperatively associated with the valve bridge and a piston biasing component for biasing the piston in a lash adjuster compression direction in which the piston tends to compress the lash adjuster;
a first limiting component for limiting stroke of the piston in the lash adjuster compression direction; and
a second limiting component for limiting the stroke of the piston in a lash adjuster expansion direction in which the piston tends to permit the lash adjuster to expand;
wherein the main event motion source includes a main event cam, the main event cam having a main event cam surface that defines a sub-base circle lash adjuster refill period, which permits refill of the lash adjuster;
wherein the second limiting component limits the stroke of the piston in the lash adjuster expansion direction to a distance that substantially equals the translated distance between the lash adjuster refill period and a main event opening and closing position on the cam.

15. The apparatus of claim 1, wherein the main event load path includes an end pivot rocker for acting on at least one engine valve, wherein the lash adjuster loading component comprises a piston cooperatively associated with the end pivot rocker and a piston biasing component for biasing the piston in a lash adjuster compression direction in which the piston tends to compress the lash adjuster.

16. The apparatus of claim 15, wherein the lash adjuster loading component comprises a first limiting component for limiting stroke of the piston in the lash adjuster compression direction.

17. The apparatus of claim 15, wherein the lash adjuster loading component has a stroke limiting loading component comprising a first surface on an annular shoulder on the piston and wherein the second limiting component comprises a second surface on the annular shoulder on the piston.

18. The apparatus of claim 17, wherein the stroke of the lash adjuster loading component is substantially equal to the translated distance between the lash adjuster refill period and a main event opening and closing position on the main event motion source.

19. The apparatus of claim 1, wherein the main event load path includes an end pivot rocker for acting on at least one engine valve and wherein the lash adjuster loading component is located in the end pivot rocker.

20. The apparatus of claim 19, wherein the lash adjuster loading component comprises a first limiting component for limiting stroke of the lash adjuster loading component in the lash adjuster compression direction and wherein the stroke of the lash adjuster loading component is substantially equal to the translated distance between a lash adjuster refill period and a main event opening and closing position on the main event motion source.

21. The apparatus of claim 1, wherein the lash adjuster loading component includes an adjustable stroke limiting component.

22. The apparatus of claim 21, wherein the adjustable stroke limiting component is a threaded element adapted to permit a user to adjust the stroke of the lash adjuster loading component.

* * * * *